United States Patent
Moriuchi

(10) Patent No.: US 10,712,429 B2
(45) Date of Patent: Jul. 14, 2020

(54) RADAR DEVICE AND SIGNAL PROCESSING METHOD

(71) Applicant: FUJITSU TEN LIMITED, Kobe-shi, Hyogo (JP)

(72) Inventor: Takumi Moriuchi, Kobe (JP)

(73) Assignee: FUJITSU TEN LIMITED, Kobe-shi (JP)

( * ) Notice: Subject to any disclaimer, the term of this patent is extended or adjusted under 35 U.S.C. 154(b) by 225 days.

(21) Appl. No.: 15/599,155

(22) Filed: May 18, 2017

(65) Prior Publication Data

US 2017/0363720 A1 Dec. 21, 2017

(30) Foreign Application Priority Data

Jun. 17, 2016 (JP) .................. 2016-121295

(51) Int. Cl.
*G01S 7/41* (2006.01)
*G01S 13/931* (2020.01)

(52) U.S. Cl.
CPC ............ *G01S 7/415* (2013.01); *G01S 13/931* (2013.01)

(58) Field of Classification Search
CPC ...................................................... G01S 7/415
See application file for complete search history.

(56) References Cited

U.S. PATENT DOCUMENTS

| | | | | |
|---|---|---|---|---|
| 6,670,912 B2* | 12/2003 | Honda | .................. | G01S 13/931 342/70 |
| 6,765,523 B2* | 7/2004 | Ono | ...................... | G01S 13/931 342/70 |
| 7,158,217 B2* | 1/2007 | Hoashi | .................... | G01S 7/486 356/4.01 |
| 7,592,945 B2* | 9/2009 | Colburn | .................... | G01C 9/00 342/70 |
| 2003/0001771 A1* | 1/2003 | Ono | ........................ | G01S 7/411 342/70 |
| 2003/0011509 A1* | 1/2003 | Honda | .................. | G01S 13/931 342/70 |
| 2006/0152405 A1* | 7/2006 | Egri | ........................ | G01S 13/878 342/70 |
| 2011/0221628 A1* | 9/2011 | Kamo | ..................... | G01S 7/295 342/70 |
| 2014/0313070 A1* | 10/2014 | Asanuma | ................ | G01S 13/02 342/200 |
| 2015/0057833 A1* | 2/2015 | Moriuchi | ................ | G01S 13/06 701/1 |
| 2018/0067206 A1* | 3/2018 | Matsunaga | ............ | G08G 1/166 |

FOREIGN PATENT DOCUMENTS

| | | |
|---|---|---|
| JP | 2011-117896 A | 6/2011 |
| JP | 2013-002927 A | 1/2013 |
| JP | 2013-156147 A | 8/2013 |
| JP | 2015-210155 A | 11/2015 |

* cited by examiner

*Primary Examiner* — Marcus E Windrich
(74) *Attorney, Agent, or Firm* — Oliff PLC

(57) ABSTRACT

There is provided a radar device. The radar device is configured to derive information on a target existing in a surrounding area of a vehicle which is equipped with the radar device on the basis of a reception signal obtained by receiving a reflected wave which is obtained by reflection of a transmission wave transmitted to the surrounding area, from the target. A determining unit is configured to determine whether the target is related to an upper object, on the basis of an integrated value of a reception level of the reception signal related to the target, and an integrated value of ground velocity related to the target.

9 Claims, 18 Drawing Sheets

RADAR DEVICE AND SIGNAL PROCESSING METHOD

CROSS-REFERENCE TO RELATED APPLICATIONS

This application is based on and claims priority from Japanese Patent Application No. 2016121295 filed on Jun. 17, 2016.

TECHNICAL FIELD

The present invention relates to a radar device and a target deriving method of the radar device.

RELATED ART

A radar device transmits a transmission signal, and receives as a reception signal, the transmission signal reflected from an object, thereby detecting a target related to the object.

An example of such a radar device is a millimeter wave radar. For example, the radar device is configured to be mounted on a vehicle, and detect targets related to objects existing around the vehicle by frequency-modulated continuous-waves (FMCWs).

The objects to be detected by the radar device mounted on the vehicle are classified roughly into, for example, still objects and moving objects. Examples of the still objects include traffic lights, poles, pedestrian bridges, power or telephone poles, road signs, and guide rails which are installed on roads, side strips, sidewalks, and so on. Examples of the moving objects include other vehicles running in front of the vehicle equipped with the radar device (hereinafter, referred to as an own vehicle) in a direction same as the traveling direction of the own vehicle (the vehicle equipped with the radar device) (hereinafter, such other vehicles may also referred to as preceding vehicles), and other vehicles running in front of the own vehicle in a direction opposite to the traveling direction of the own vehicle (hereinafter, such other vehicles may also referred to as oncoming vehicles).

The radar devices mounted on the vehicle determines whether each target is necessary to control the vehicle. Examples of targets unnecessary to control the vehicle include targets related to still objects installed at positions higher than the height of the own vehicle by a predetermined distance (hereinafter, such still objects may also be referred to as upper objects) and targets related to still objects installed at positions lower than the bottom of the own vehicle (hereinafter, such still objects may also be referred to as lower objects). Examples of the upper objects include traffic lights, pedestrian bridges, and road signs, and examples of lower objects include median strips (center dividers) of toad, and road studs installed on curved roads.

Patent Document 1: Japanese Patent Application Publication No. 2015-210155A

A "vehicle control device" is configured to be mounted on a vehicle and to be connected to the radar device to control the behavior of the vehicle. The vehicle control device controls the behavior of the vehicle, for example, on the basis of the distance between the radar device and a target which is a reference for vehicle behavior control by the vehicle control device (hereinafter, such a target may also be referred to as a target of the vehicle control device). For example, an advanced emergency braking system (AEBS) which is one of the vehicle control devices activates the brake of the own vehicle when the distance between the own vehicle and a preceding vehicle which is the target of the vehicle control device becomes less than a threshold, thereby preventing the vehicle from rear-ending the preceding vehicle. Also, for example, an adaptive cruise control (ACC) system which is one of the vehicle control devices controls the vehicle to follow a preceding vehicle which is the target of the vehicle control device while keeping a constant distance between the vehicle and the preceding vehicle.

In general, since vehicles can pass under the upper objects, vehicles have no risk of colliding with upper objects. Therefore, the upper objects are unsuitable as targets of the vehicle control device. Therefore, in the radar device, it is important to accurately determine whether each target is an upper object.

SUMMARY

It is therefore an object of the present invention to accurately determine whether each target is an upper object.

According to an aspect of the embodiments of the present invention, there is provided a radar device with a determining unit. The radar device is configured to derive information on a target existing in a surrounding area of a vehicle which is equipped with the radar device on the basis of a reception signal obtained by receiving a reflected wave which is obtained by reflection of a transmission wave transmitted to the surrounding area, from the target. A determining unit is configured to determine whether the target is related to an upper object, on the basis of an integrated value of a reception level of the reception signal related to the target, and an integrated value of ground velocity related to the target.

According to the aspect of the embodiments of the present invention, it is possible to accurately determine whether each target is the upper object.

BRIEF DESCRIPTION OF THE DRAWINGS

Exemplary embodiments of the present invention will be described in detailed based on the following figures, wherein.

DETAILED DESCRIPTION

A radar device according to the disclosure of the present application is configured to transmit a transmission signal in which a transmission frequency varies in a predetermined cycle, and receive the transmission signal reflected from an object, as a reception signal. Subsequently, the radar device according to the disclosure of the present application acquires peaks of the frequency spectra of signals (hereinafter, referred to as beat signals) representing the frequency differences (hereinafter, referred to as beat frequencies) between the transmission frequency of the transmission signal and the reception frequencies of the reception signal, in sections in which the transmission frequency increases (hereinafter, referred to as UP sections) and sections in which the transmission frequency decreases (hereinafter, referred to as DOWN sections). Subsequently, the radar device according to the disclosure of the present application derives information items on targets (hereinafter, also referred to as target information items), on the basis of the peaks in the UP sections (hereinafter, also referred to as UP peaks) and the peaks in the DOWN sections (hereinafter, also referred to as DOWN peaks).

Hereinafter, embodiments of the radar device and an upper-object determining method according to the disclosure of the present application will be described with reference to the accompanying drawings. The radar device and the upper-object determining method according to the present invention are not limited to the embodiments. Hereinafter, throughout the embodiments, components/configurations having the same functions and steps for performing the same processes are denoted with the same reference symbols.

First Embodiment

<Configuration of Vehicle Control System>

Figure 1:
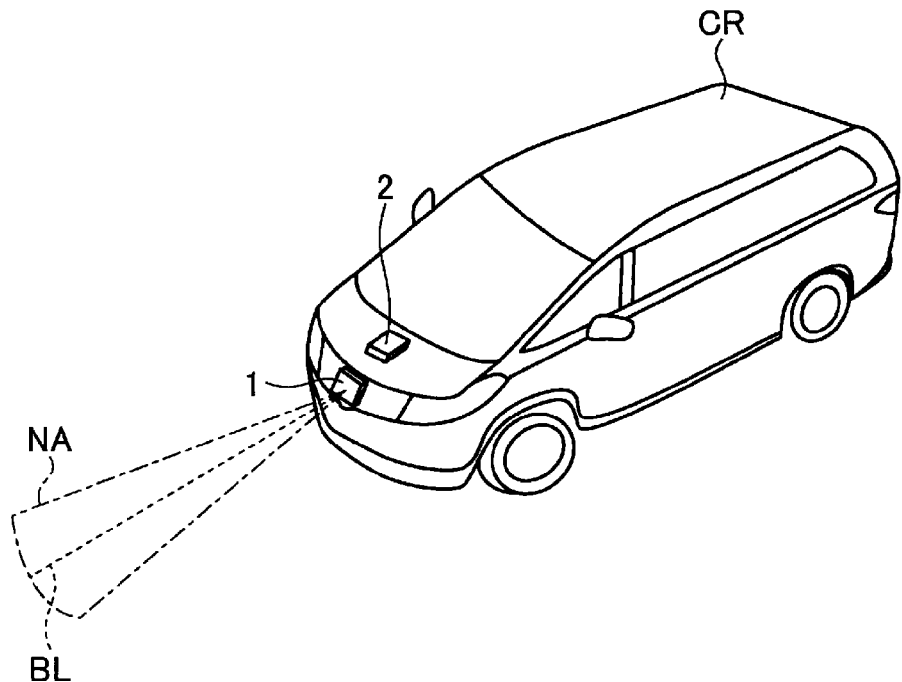
FIG. 1 is a view illustrating an example of a vehicle equipped with a vehicle control system according to a first embodiment of the present invention.
Figure 2:
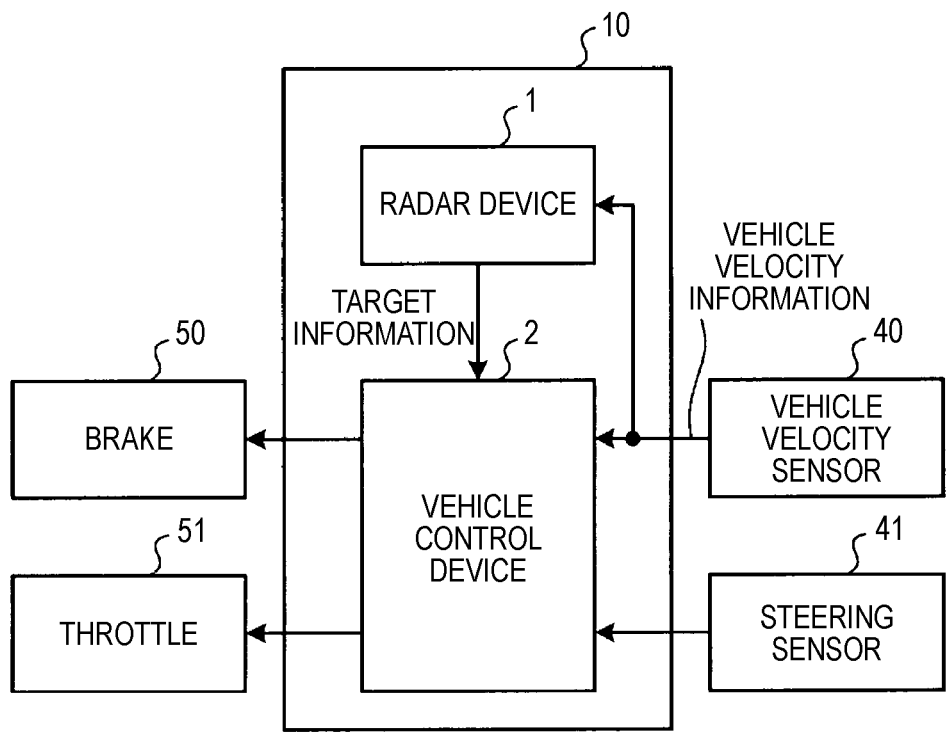
FIG. 2 is a view illustrating a configuration example of the vehicle control system according to the first embodiment of the present invention.

FIG. 1 is a view illustrating an example of a vehicle equipped with a vehicle control system of a first embodiment, and FIG. 2 is a view illustrating a configuration example of the vehicle control system of the first embodiment.

In FIG. 1, a vehicle CR (hereinafter, also referred to as an own vehicle CR) is equipped with a radar device 1 and a vehicle control device 2. The radar device 1 and the vehicle control device 2 are included in a vehicle control system 10 as shown in FIG. 2. The vehicle control device 2 may be implemented by an electronic control unit (ECU). The radar device 1 may be mounted close to the front bumper of the vehicle CR. The radar device 1 transmits a transmission signal having, for example, a beam pattern NA with a central axis BL, thereby scanning a predetermined scan range, and derives the distance between the own vehicle CR and a target in the traveling direction of the vehicle (hereinafter, such a distance will also be referred to as a longitudinal distance) and the distance between the own vehicle CR and the target in the transverse direction of the vehicle (the vehicle width direction) (hereinafter, such a distance will also be referred to as a transverse distance), thereby deriving information items on the positions of the targets relative to the own vehicle CR. Also, the radar device 1 derives the velocity of the target (hereinafter, also referred to as a relative velocity) relative to the velocity of the own vehicle CR (hereinafter, also referred to as the own vehicle velocity).

In FIG. 2, the vehicle control system 10 includes the radar device 1 and the vehicle control device 2. The radar device 1 outputs the target information items to the vehicle control device 2. The target information items output from the radar device 1 include the longitudinal distances, the transverse distances, and the relative velocities.

The vehicle control device 2 is connected to a vehicle velocity sensor 40, a steering sensor 41, a brake 50, and a throttle 51. The vehicle velocity sensor 40, the steering sensor 41, the brake 50, and the throttle 51 are mounted on the vehicle CR.

The vehicle velocity sensor 40 detects the own vehicle velocity, and outputs information on the detected own vehicle velocity (hereinafter, also referred to as own vehicle velocity information) to the radar device 1 and the vehicle control device 2. The steering sensor 41 detects the steering angle of the vehicle CR, and outputs information on the detected steering angle to the vehicle control device 2. The brake 50 decreases the own vehicle velocity according to the control of the vehicle control device 2. The throttle 51 increases the own vehicle velocity according to the control of the vehicle control device 2.

The vehicle control device 2 controls the operations of the brake 50 and the throttle 51 on the basis of the target information items, the own vehicle velocity detected by the vehicle velocity sensor 40 and the steering angle detected by the steering sensor 41, thereby controlling the behavior of the vehicle CR. For example, the vehicle control device 2 controls the brake 50 and the throttle 51 on the basis of the target information items, the own vehicle velocity, and the steering angle of the vehicle CR, thereby implementing the adaptive cruise control (ACC) in which the vehicle CR follows a preceding vehicle while keeping a constant distance between the vehicle CR and the preceding vehicle. Also, for example, the vehicle control device 2 controls the brake 50 and the throttle 51 on the basis of the target information items, the own vehicle velocity, and the steering angle of the vehicle CR, thereby implementing the advanced emergency braking system (AEBS) for decreasing the own vehicle velocity if the vehicle CR is in danger of colliding with an obstacle.

<Configuration of Radar Device>

Figure 3:
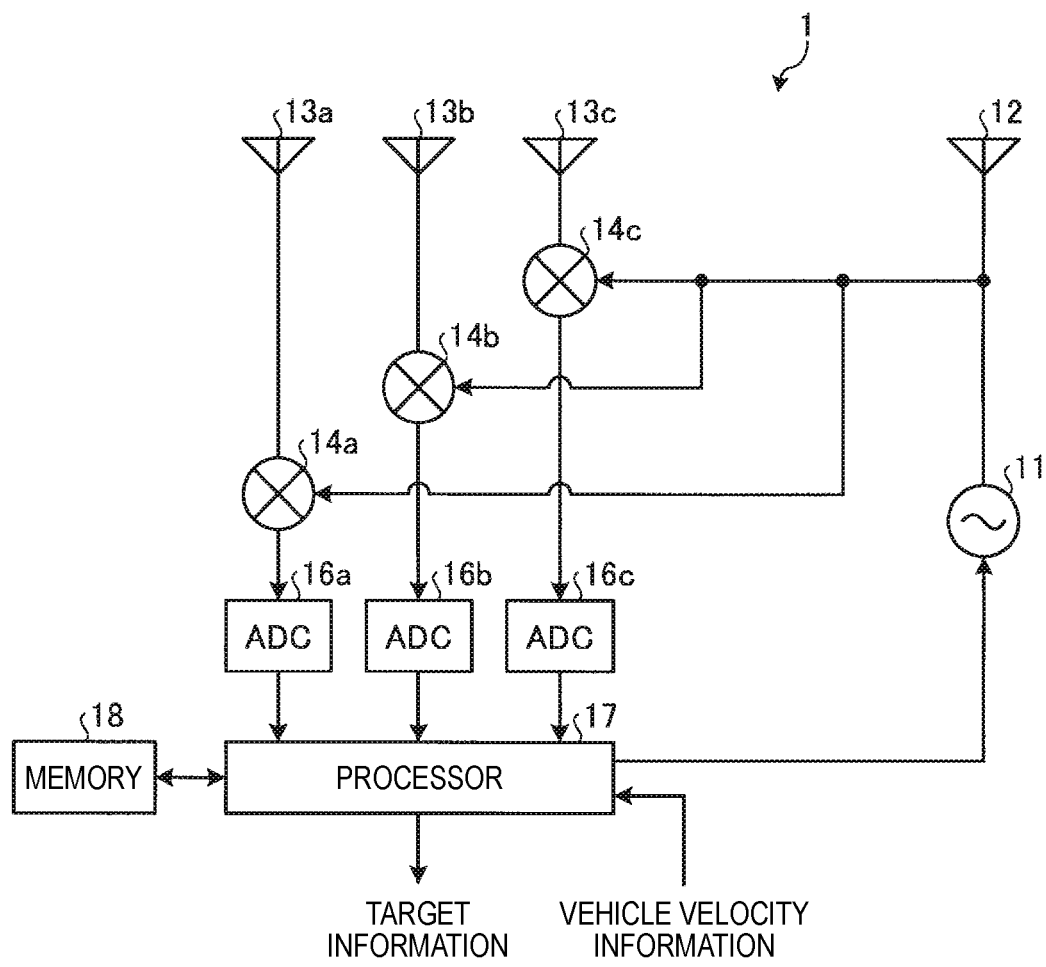
FIG. 3 is a view illustrating a configuration example of a radar device according to the first embodiment of the present invention.

FIG. 3 is a view illustrating a configuration example of the radar device of the first embodiment. In FIG. 3, the radar device 1 includes a processor 17, a memory 18, an oscillator 11, a transmitting antenna 12, receiving antennae 13a, 13b, and 13c, mixers 14a, 14b, and 14c, and analog-to-digital converters (ADCs) 16a, 16b, and 16c. The processor 17 outputs the target information items. The receiving antennae 13a, 13b, and 13c are disposed side by side on a straight line at regular intervals to form an antenna array. Examples of the processor 17 include a central processing unit (CPU), a digital signal processor (DSP), and a field programmable gate array (FPGA). Also, examples of the memory 18 include a RAM such as an SDRAM, a ROM, and a flash memory. Hereinafter, the receiving antennae 13a, 13b, and 13c will also be collectively referred to as the "receiving antennae 13", and the mixers 14a, 14b, and 14c will also be collectively referred to as the "mixers 14", and the ADCs 16a, 16b, and 16c will also be collectively referred to as the "ADCs 16".

The oscillator 11 performs frequency modulation on a continuous-wave signal on the basis of a modulation signal input from the processor 17, thereby generating a transmission signal in which a frequency thereof varies as time goes on, and outputs the generated transmission signal to the transmitting antenna 12 and the mixers 14.

The transmitting antenna 12 transmits the transmission signal obtained by the frequency modulation of the oscillator 11, as a transmission wave.

If the transmission signal transmitted as the transmission wave is reflected from an object existing around the radar device 1, the receiving antennae 13 receive reflected waves as reception signals.

The mixers 14 mixes the transmission signal input from the oscillator 11 with the reception signals input from the receiving antennae 13. By the mixing of the mixers 14, beat signals representing beat frequencies which are the frequency differences between the transmission frequency of the transmission signal and the reception frequencies of the reception signals are generated. The mixers 14 outputs the beat signals generated by the mixing, to the ADCs 16.

The ADCs 16 convert the analog beat signals into digital beat signals, and outputs the digital beat signals to the processor 17.

<Relation Between Transmission Signals and Reception Signals>

Figure 4:
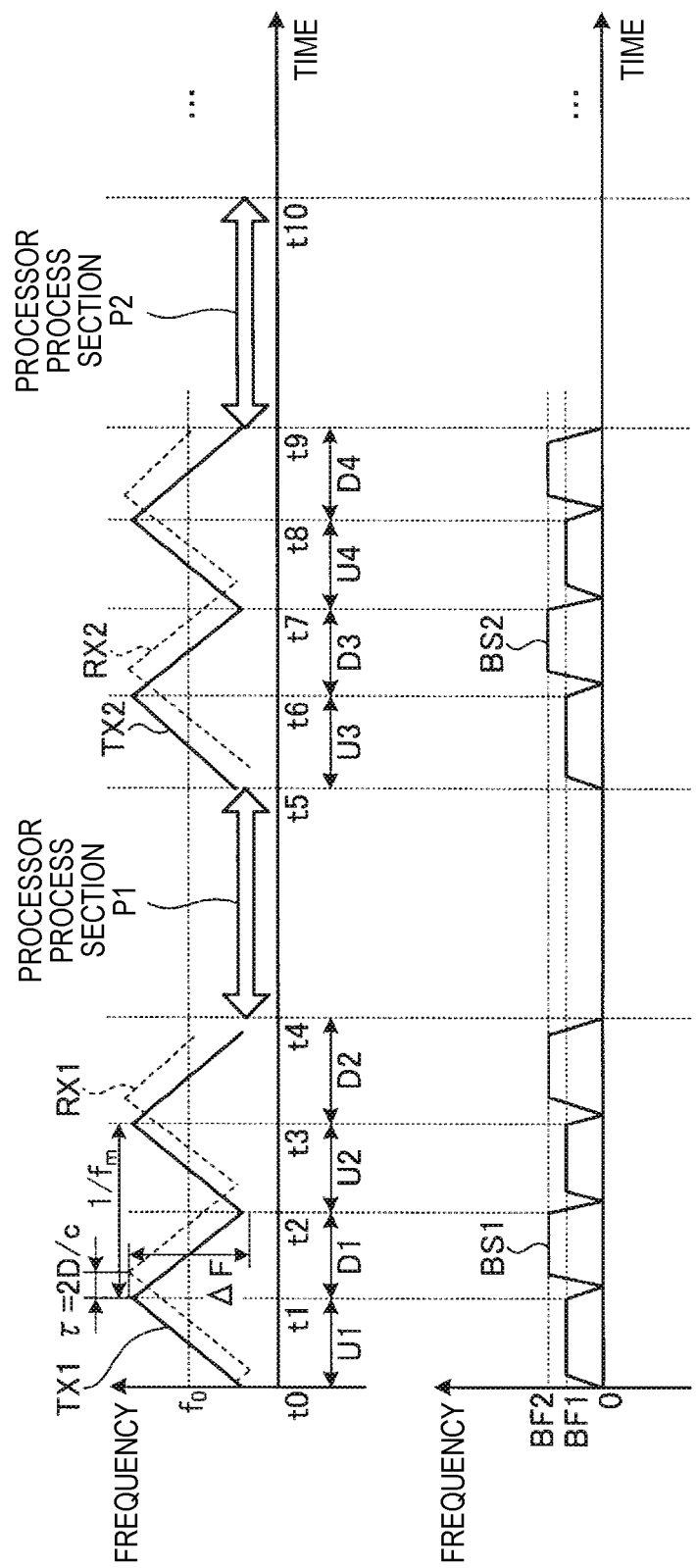
FIG. 4 is a view illustrating an example of the relation between transmission signals and reception signals according to the first embodiment of the present invention.

FIG. 4 is a view illustrating an example of the relation between transmission signals of the first embodiment and reception signals. The following description will be made taking an FM-CW system as an example. However, systems to which the technology according to the disclosure of the present application can be applied are not limited to FM-CW systems. The technology according to the disclosure of the present application can be applied to any systems for detecting targets on the basis of UP sections in which the transmission frequency of a transmission signal increases and DOWN sections in which the transmission frequency of the transmission signal decreases.

In the following description, "fr" represents distant frequency, "fd" represents velocity frequency, "f0" represents center frequency of transmission signal, "ΔF" represents frequency shift width, "fm" represents modulation signal repetition frequency, "c" represents velocity of light (radio-wave velocity), "T" represents radio-wave round-trip time between the radar device and a target, "fs" represents ratio of transmission frequency to reception frequency, "R" represents longitudinal distance, "V" represents relative velocity, "θm" represents horizontal angle of the target relative to the radar device 1, "θup" represents horizontal angle corresponds to UP peak, "θdn" represents horizontal angle corresponds to DOWN peak, and "D" represents distance from the radar device 1 to the target. Hereinafter, transmission signals TX1 and TX2 will also be collectively referred to as "transmission signals TX", reception signals RX1 and RX2 will also be collectively referred to as "reception signals RX", and beat signals BS1 and BS2 will also be collectively referred to as "beat signals BS".

In an upper view of FIG. 4, in a section between a time point t0 and a time point t4, the transmission frequency of the transmission signal TX1 has f0 as the center frequency, and repeatedly increases and decreases in a predetermined cycle "1/fm". Specifically, the transmission frequency of the transmission signal TX1 increases to an upper limit frequency in an UP section U1, and decreases to a lower limit frequency in a DOWN section D1, and increases to the upper limit frequency in an UP section U2, and decreases to the lower limit frequency in a DOWN section D2. For example, the center frequency f0 is 76.5 GHz, and the upper limit frequency is 76.6 GHz, and the lower limit frequency is 76.4 GHz. Whenever performing transmission, the radar device 1 transmits a transmission signal TX corresponding to two periods each of which is a section composed of one UP section and one DOWN section. Also, in a case where the radar device 1 transmits the transmission signal TX1 from the transmitting antenna 12, and receives a reflected signal of the transmission signal from an object as the reception signal RX1 by the receiving antennae 13, similarly to the transmission signal TX1, the reception frequency of the reception signal RX1 also repeatedly increases and decreases in the predetermined cycle "1/fm".

Subsequently, in a processor process section P1, the processor 17 performs signal processing for deriving target information using the transmission signal TX1 and the reception signal RX1.

Subsequently, in a section between a time point t5 and a time point t9, similarly in the section between the time point t0 and the time point t4, the transmission frequency of the transmission signal TX2 has f0 as the center frequency, and repeatedly increases and decreases in the predetermined cycle "1/fm". Specifically, the transmission frequency of the transmission signal TX2 increases to the upper limit frequency in an UP section U3, and decreases to the lower limit frequency in a DOWN section D3, and increases to the upper limit frequency in an UP section U4, and decreases to the lower limit frequency in a DOWN section D4. Also, in a case where the radar device 1 transmits the transmission signal TX2 from the transmitting antenna 12, and receives a reflected signal of the transmission signal from an object as the reception signal RX2 by the receiving antennae 13, similarly to the transmission signal TX2, the reception frequency of the reception signal RX2 also repeatedly increases and decreases in the predetermined cycle "1/fm".

Subsequently, in a processor process section P2 between the time point t9 and a time point t10, the processor 17 performs signal processing for deriving target information using the transmission signal TX2 and the reception signal RX2.

Even after the time point t10, processing identical to that of the section between the time point t0 and the time point t10 is repeated. As described above, the radar device 1 repeatedly performs the sequence of transmission of a transmission signal TX, reception of a reception signal RX, and derivation of target information.

With respect to a transmission signals TX, a reception signal RX has a delay time τ. The delay time τ depends on a distance D from the radar device 1 to a target. Further, in a case where there is a velocity difference between the own vehicle velocity and the velocity of the target, the reception signal RX has a frequency difference corresponding to a Doppler shift with respect to the transmission signal TX.

A lower view of FIG. 4 shows beat signals BS. A beat signal BS1 is generated by mixing the transmission signal TX1 and the reception signal RX1, and a beat signal BS2 is generated by mixing the transmission signal TX2 and the reception signal RX2. The beat signals BS represent the frequency differences between the transmission frequencies of the transmission signals TX and the reception frequencies of the reception signals RX (i.e. beat frequencies). For example, the beat frequencies in the UP sections U1, U2, U3, and U4 become BF1, and the beat frequencies in the DOWN sections D1, D2, D3, and D4 becomes BF2. As described above, in each section, a beat frequency is derived.

Subsequently, the processor 17 performs fast Fourier transform (FFT) on the beat signals BS input from the ADCs 16, thereby converting the beat signals BS into frequency spectra which are frequency domain data. In other words, in each of the UP sections and the DOWN sections, the frequency spectrum of the beat signal BS is obtained. Hereinafter, the frequency spectra of beat signals BS will also be referred to as "FFT data items".

Then, on the basis of the FFT data items derived as described above, the longitudinal distance, relative velocity, and transverse distance of each target relative to the radar device 1 are derived. For example, the distance of each target from the radar device 1 is derived by Expression 1, and the relative velocity of each target relative to the radar device 1 is derived by Expression 2. Also, for example, the angle of each target relative to the radar device 1 is derived by Expression 3. Then, the longitudinal distance and transverse distance of each target relative to the radar device 1 is derived by performing a calculation using a trigonometric function on the basis of the distance derived by Expression 1, and the angle derived by Expression 3.

[Expression 1]

$$R = \frac{(f_{up} + f_{dn}) \cdot c}{2 \times (4 \times \Delta F \times f_m)} \quad (1)$$

[Expression 2]

$$V = \frac{(f_{up} - f_{dn}) \cdot c}{2 \times (4 \times \Delta F \times f_m)} \quad (2)$$

[Expression 3]

$$\theta_m = \frac{\theta_{up} + \theta_{dn}}{2} \quad (3)$$

<Functions of Processor>

Figure 5:
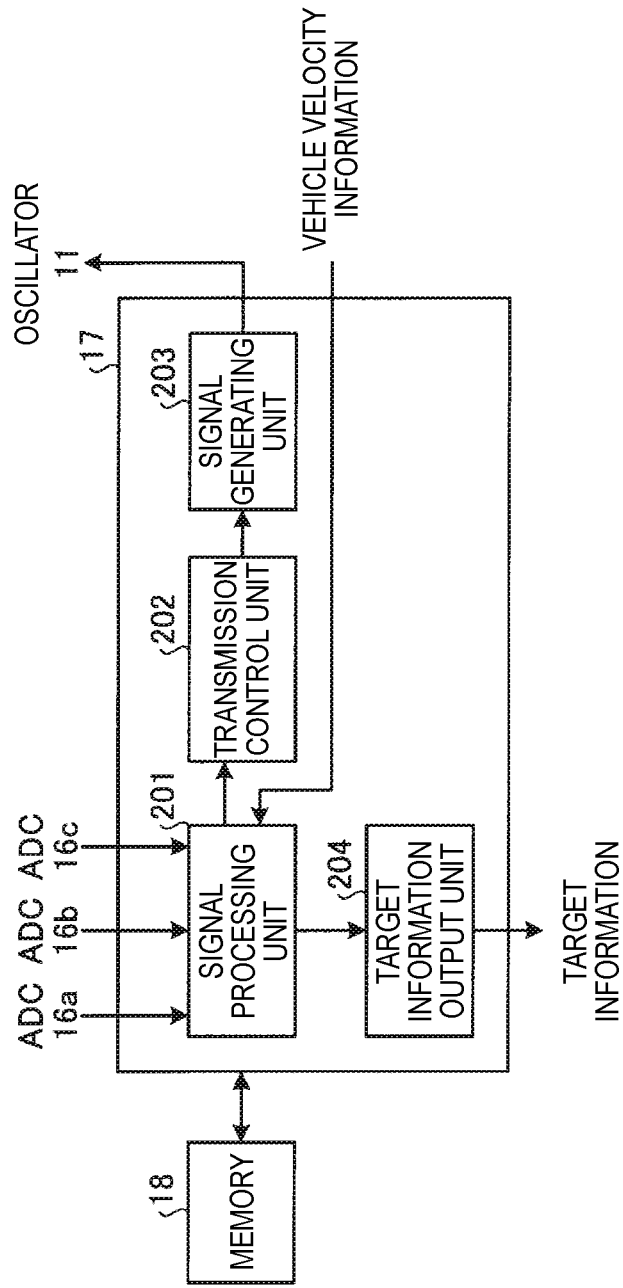
FIG. 5 is a functional block diagram illustrating functions of a processor according to the first embodiment of the present invention.

FIG. 5 is a functional block diagram illustrating functions of the processor of the first embodiment. In FIG. 5, the processor 17 has a signal processing unit 201, a transmission control unit 202, a signal generating unit 203, and a target information output unit 204, as functions of the processor 17.

According to control of the transmission control unit 202, the signal generating unit 203 generates a modulation signal whose voltage varies in a triangular wave form, and outputs the generated modulation signal to the oscillator 11.

The signal processing unit 201 acquires peaks of FFT data items in UP sections and DOWN sections, respectively, and derives target information items on the basis of the UP peaks and the DOWN peaks. At this time, from the FFT data items of the UP sections, the signal processing unit 201 extracts peaks of the FFT data items having power exceeding a predetermined threshold, as UP peaks. Also, from FFT data items of the DOWN sections, signal processing unit extracts peaks of the FFT data items having power exceeding a predetermined threshold, as DOWN peaks. Then, the signal processing unit 201 outputs the derived target information items to the target information output unit 204. This process which is performed by the signal processing unit 201 will be described in detail.

The target information output unit 204 selects a predetermined number of target information items having high priorities, from the target information items input from the signal processing unit 201, and outputs the selected target information items to the vehicle control device 2.

The FFT data items, the target information items, and so on derived by the signal processing unit 201 are stored in the memory 18. For example, FFT data items and target information items derived in the previous process section (for example, the processor process section P1 (FIG. 4)) and the current process section (for example, the processor process section P2 (FIG. 4)) are stored in the memory 18. In other words, a plurality of time-series FFT data items and a plurality of time-series target information items are stored in the memory 18.

The transmission control unit 202 outputs a modulation signal generation instruction to the signal generating unit 203, in response to an instruction from the signal processing unit 201. For example, time points t1, t5, and t10 shown in FIG. 4, the signal processing unit 201 instructs the transmission control unit 202 to output the modulation signal generation instruction.

<Process of Radar Device>

Figure 6:
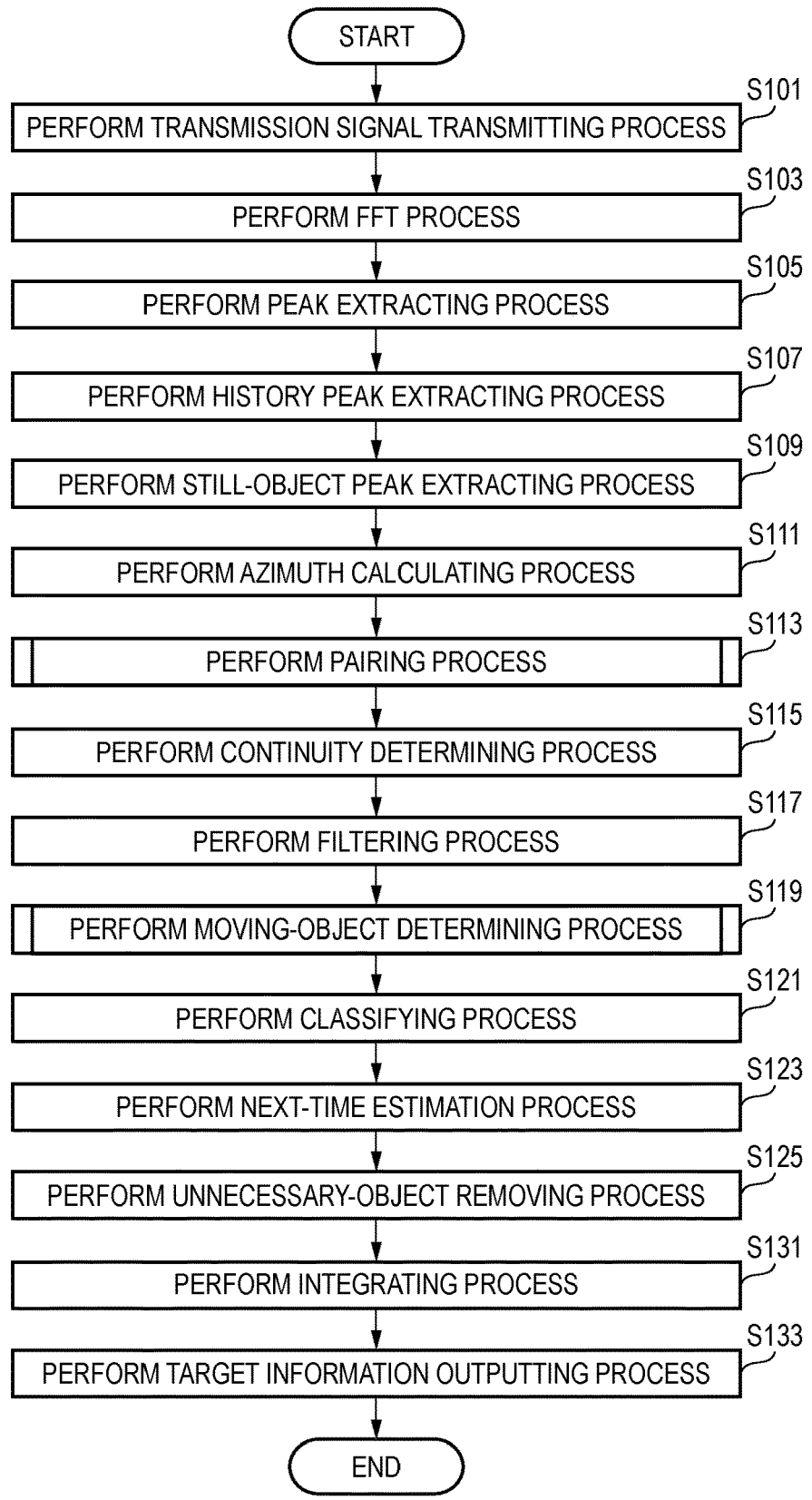
FIG. 6 is a flow chart for explaining an example of a process of the radar device according to the first embodiment of the present invention.

FIG. 6 is a flow chart available for explaining an example of a process of the radar device of the first embodiment. In the flow chart of FIG. 6, the process of STEP S101 is performed from the time point t1 to the time point t4 and from the time point t5 to the time point t9 (FIG. 4), and the processes of STEPS S103 to S133 are performed in the processor process section P1 (from the time point t4 to the time point t5) and the processor process section P2 (from the time point t9 to the time point t10). Also, with respect to each of the processes of STEPS S103 to S133 of the flow chart of FIG. 6, if a "previous process" is performed in the processor process section P1, a "current process" is performed in the processor process section P2.

First, in STEP S101, if a transmission signal TX transmitted from the transmitting antenna 12 is reflected from objects and the reflected signals reach the radar device 1, the reflected signals are received as reception signals Rx by the receiving antennae 13. The transmission signal TX and the reception signals Rx are mixed by the mixers 14, whereby analog beat signals BS are generated. The analog beat signals BS are converted into digital beat signals BS by the ADCs 16, and the digital beat signals BS are input to the signal processing unit 201.

Subsequently, in STEP S103, the signal processing unit 201 performs FFT on the beat signals BS input from the ADCs 16, thereby acquiring FFT data items of UP sections and DOWN sections, respectively.

Subsequently, in STEP S105, the signal processing unit 201 performs a peak extracting process, thereby acquiring peaks from the FFT data items of the UP sections and the DOWN sections, respectively. In the peak extracting process, from the FFT data items of the UP sections, the signal processing unit 201 extracts peaks of the FFT data items having power exceeding the predetermined threshold, as UP peaks. Also, from FFT data items of the DOWN sections, signal processing unit extracts peaks of the FFT data items having power exceeding the predetermined threshold, as DOWN peaks.

Subsequently, in STEP S107, the signal processing unit 201 performs a "history peak extracting process" of extracting peaks (hereinafter, such peaks will also be referred to as "history peaks") having temporal continuity with peaks acquired with respect to targets in the past, from the peaks extracted by the current peak extracting process (STEP S105).

In other words, in STEP S107, the signal processing unit 201 extracts peaks existing in predetermined frequency ranges set with reference to the frequencies of peak estimate values (hereinafter, also referred to as "estimate peaks") derived by performing a "next-time estimation process" (STEP S121) in the previous process section of the processor 17, as history peaks of the UP sections and the DOWN sections, respectively. Hereinafter, UP peak estimate values will also be referred to as "estimate UP peaks", and DOWN estimate peak values will also be referred to as "estimate DOWN peaks". Also, hereinafter, history peaks of the UP sections will also be referred to as "history UP peaks", and history peaks of the DOWN sections will also be referred to as "history DOWN peaks". Hereinafter, the process of STEP S107 will be described in more detail.

Figure 7:
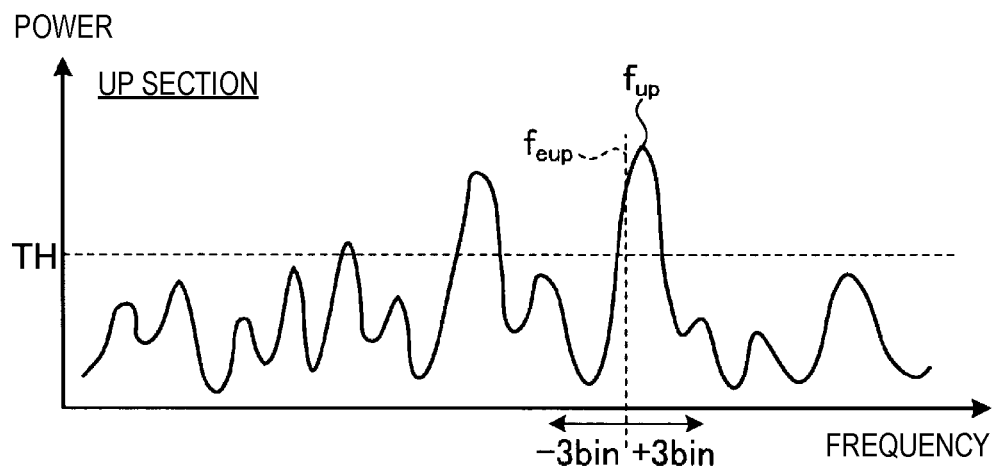
FIG. 7 is a view for explaining an operation example of a signal processing unit according to the first embodiment of the present invention.
Figure 8:
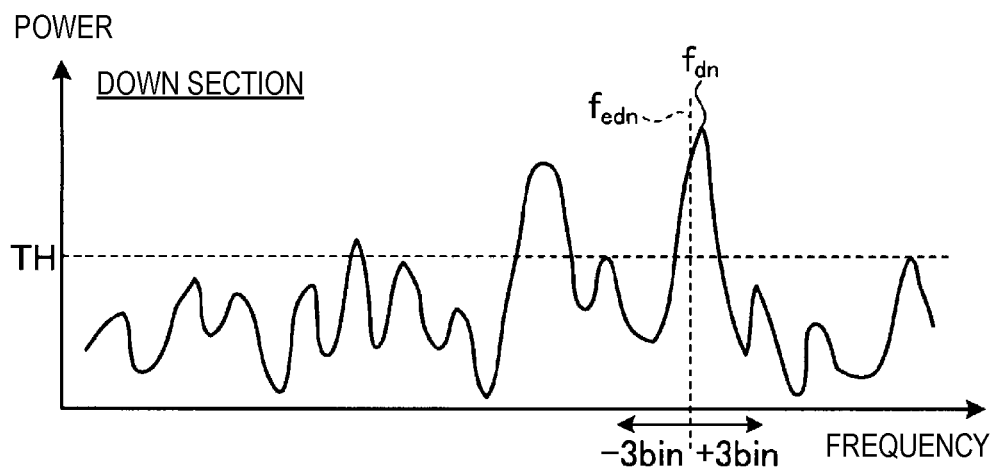
FIG. 8 is a view for explaining the operation example of the signal processing unit according to the first embodiment of the present invention.

FIGS. 7 and 8 are views available for explaining an operation example of the signal processing unit of the first embodiment. FIG. 7 shows an UP peak of an FFT data item, and FIG. 8 shows a DOWN peak of an FFT data item. In FIG. 7, the signal processing unit 201 searches a range of six bins having the frequency feup of an estimate UP peak as its center, for history UP peaks. In the case shown in FIG. 7, since an UP peak fup having power equal to or higher than a threshold TH exists in the range of six bins having the frequency feup as the center, the signal processing unit 201 the UP peak fup as a history UP peak. For example, 1 bin is about 468 Hz.

Similarly, in FIG. 8, the signal processing unit 201 searches a range of ±3 bines around the frequency fedn of an estimate DOWN peak, for history DOWN peaks. In the case shown in FIG. 8, since a DOWN peak fdn having power equal to or higher than a threshold TH exists in the range of ±3 bins around the frequency fedn as the center, the signal processing unit 201 extracts the DOWN peak fdn as a history DOWN peak.

Also, in a case where a plurality of peaks having power equal to or higher than the threshold TH exists in a range of ±3 bins around the frequency of an estimate peak, the signal processing unit 201 extracts a peak having a frequency closest to the frequency of the estimate peak, as a history peak.

Subsequently, in STEP S109, on the basis of the own vehicle velocity information input from the vehicle velocity sensor 40, the signal processing unit 201 extracts peaks of sections in which the frequency differences between the UP sections and the DOWN sections correspond to the own vehicle velocity, as peaks corresponding to still objects (hereinafter, also referred to as still-object peaks). Here, still objects are objects having relative velocities having almost the same magnitude as that of the own vehicle velocity, and moving objects are objects having relative velocities having magnitudes different from that of the own vehicle velocity.

Also, as described above, the history peak extracting process (STEP S107) and the still-object peak extracting process (STEP S109) are performed in order to select peaks corresponding to targets which the radar device 1 needs to preferentially notify to the vehicle control device 2. For example, among the targets corresponding to the peaks extracted by the current peak extracting process (STEP S105), targets corresponding to peaks having temporal continuity with the peaks of targets extracted in the previous peak extracting process are more likely to exist, as compared to targets corresponding to peaks newly extracted by the current peak extracting process. For this reason, peaks having temporal continuity may have priorities higher than those of newly extracted peaks. Also, for example, since moving objects are more likely than still objects to collide with the vehicle CR, peaks corresponding to moving objects may have priorities higher than those of peaks corresponding to still objects.

Subsequently, in STEP S111, the signal processing unit 201 calculates the azimuths of the targets of the UP sections and the DOWN sections, on the basis of the extracted peaks, respectively. For example, the signal processing unit 201 derives the azimuths (angles) of the targets by a predetermined azimuth calculating algorithm such as ESPRIT (Estimation of Signal Parameters via Rotational Invariance Techniques). In a case where ESPRIT can be used, the signal processing unit 201 calculates the eigenvalues, eigenvectors, and so on of correlation matrixes from the phase information items of the reception signals Rx of the receiving antennae 13, and derives angles θup corresponding to the UP peaks and angles θdn corresponding to the DOWN peaks. Subsequently, the signal processing unit 201 calculates the angles of the targets from the angles θup and the angles θdn by Expression 3. However, peaks of a plurality of target information items having the same distance value and different angle values as information items on the positions of targets relative to the radar device 1 may exist at the same frequency. In this case, since the phases of a plurality of reception signals Rx input from different angles are different from each other, on the basis of the phases of the reception signals Rx, the signal processing unit 201 calculates a plurality of angles corresponding to a plurality of targets with respect to one peak.

Subsequently, in STEP S113, the signal processing unit 201 performs a "pairing process" of pairing the UP peaks and the DOWN peaks. With respect to the history peaks extracted by the history peak extracting process of STEP S107 from all peaks extracted by the peak extracting process of STEP S105, this pairing process is performed between the history UP peaks and the history DOWN peaks. With respect to the still-object peaks extracted by the still-object peak extracting process of STEP S109 from all peaks extracted by the peak extracting process of STEP S105, the pairing process is performed between still-object peaks of the UP sections (hereinafter, also referred to as "still-object UP peaks") and still-object peaks of the DOWN sections (hereinafter, also referred to as "still-object DOWN peaks"). Further, with respect to the other peaks (hereinafter, also referred to as "remaining peaks") of all peaks extracted by the peak extracting process of STEP S105 except for the history peaks and the still-object peaks, the pairing process is performed between remaining peaks of the UP sections (hereinafter, also referred to as "remaining UP peaks") and remaining peaks of the DOWN sections (hereinafter, also referred to as "remaining DOWN peaks").

Also, the pairing process between the UP peaks and the DOWN peaks is performed by calculation using, for example, "Mahalanobis distances". For example, before the radar device 1 is mounted on the vehicle CR, pairing of UP peaks and DOWN peaks is experimentally performed a plurality of times. Then, a plurality of correct pair data items obtained by the plurality of pairing processes and a plurality of incorrect pair data items obtained by the plurality of pairing processes are acquired as "normal pairs" and "erroneous pairs", respectively. The normal pairs are pair data items obtained by the pairing processes of correct combinations from among the plurality of parings. The erroneous pairs are pair data items obtained by the pairing processes of erroneous combinations from among the plurality of parings. Therefore, with respect to each of the plurality of normal pairs, the values of three parameters of "frequency spectrum power difference", "angle difference", and "angle spectrum power difference" between an UP peak and a DOWN peak are obtained, and with respect to the plurality of normal pairs, the average values of each of the three parameters is derived, and are stored in the memory 18 in advance.

Then, after the radar device 1 is mounted on the vehicle CR, when the processor 17 derives target information items, the signal processing unit 201 derives Mahalanobis distances DM(x) by Expression 4 using the values of three parameter of every combination of the UP peaks and the DOWN peaks and the average value of each of the three parameters relative to the plurality of normal pairs. Further, the signal processing unit 201 derives a pair having the minimum Mahalanobis distance DM(x) in the current process, as a normal pair. Here, a Mahalanobis distance DM(x) corresponds to a group of values expressed by a multivariable vector x=(x1, x2, x3) whose average μ is (μ1, μ2, μ3)$^T$ and whose covariance matrix is Σ, and is derived by Expression 4. Also, the elements μ1, μ2, and μ3 represent the values of the three parameters of the normal pair, and the elements x1, x2, and x3 represent the values of three parameters of the pair of the current process.

[Expression 4]

$$D_M(x) = \sqrt{(x-\mu)^T \Sigma^{-1} (x-\mu)} \quad (4)$$

Thereafter, in the pairing process, the signal processing unit 201 derives the longitudinal distance, relative velocity, and transverse distance of each normal pair, using the parameter values of the normal pairs and Expressions 1 to 3. Meanwhile, a pairing process using history peaks will be described below.

Subsequently, in STEP S115, the signal processing unit 201 determines whether each pair of pair data items obtained by the current pairing process (STEP S113) (hereinafter, such a pair of pair data items will also be referred to as a "current pair") has temporal continuity with any pair of pair data items obtained by the previous pairing process of (STEP S113) (hereinafter, such a pair of data items will also be referred to as a "previous pair). Here, a case where a current pair and a previous pair have temporal continuity means, for example, a case where all of the longitudinal distance difference, transverse distance difference, and relative velocity difference between a current pair estimated on the basis of the previous pair (hereinafter, such a pair will also be referred to as an "estimate pair") and the current pair actually acquired are equal to or smaller than predetermined values. In this case, it is determined that the target detected by the current process and the target detected by the previous process are the same target. Meanwhile, in a case where there is a plurality of current pairs having the longitudinal distance difference, transverse distance difference, and relative velocity difference equal to or smaller than the predetermined values with respect to an estimate pair, among the plurality of current pairs, the signal processing unit 201 determines a current pair closest to the estimate pair, as pair data items having temporal continuity with the previous pair.

Meanwhile, in a case where any one of the longitudinal distance difference, transverse distance difference, and relative velocity difference between an estimate pair and an actually acquired current pair is larger than the predetermined value, the signal processing unit 201 determines that the current pair and the previous pair do not have temporal continuity. Further, a current pair determined as having no temporal continuity with any previous pair is determined as pair data items derived for the first time in the current process (hereinafter, such data items will also be referred to as a "new pair").

Subsequently, in STEP S117, in the case where the current pair and the previous pair have temporal continuity, the signal processing unit 201 performs filtering on the current pair and the previous pair with respect to longitudinal distances, relative velocities, transverse distances, and power values, thereby deriving filtered pair data items (hereinafter, also referred to as "filter data items").

For example, in the case where a current pair and a previous pair have temporal continuity, with respect to the transverse distances, the signal processing unit 201 assigns 0.75 and 0.25 as weights to the transverse distance of the estimate pair and the transverse distance of the current pair, respectively, and derives the sum of the weighted transverse distances as the transverse distance of the filter data items of the current process. Even with respect to the longitudinal distances, the relative velocities, and the power values, the signal processing unit 201 performs filtering similar to that on the transverse distances.

Subsequently, in STEP S119, on the basis of the relative velocity between the own vehicle and each target, the signal processing unit 201 performs a "moving-object determining process" of determining whether the target is a target related to a moving object or a target related to a still object. In the moving-object determining process, the signal processing unit 201 sets "moving-object flags" of pair data items corresponding to targets related to moving objects, to an ON state, and sets "moving-object flags" of pair data items corresponding to targets related to still objects, to an OFF state. In other words, the "moving-object flag" is a flag representing whether a detected target is a target related to a moving object or a target related to a still object. The target information output unit 204 recognizes pair data items having moving-object flags set to the ON state (hereinafter, such data items will also be referred to as "moving-object pairs"), as pair data items corresponding to moving objects, and recognizes pair data items having moving-object flags set to the OFF state (hereinafter, such data items will also be referred to as "still-object pairs"), as pair data items corresponding to still objects. Details of the moving-object determining process will be described below.

Subsequently, in STEP S121, the signal processing unit 201 classifies the filter data items into filter data items corresponding to preceding vehicles, filter data items corresponding to oncoming vehicles, and filter data items corresponding to still objects. For example, the signal processing unit 201 classifies filter data items having relative velocities having the opposite sign to that of the velocity of the own vehicle CR and having magnitudes larger than the velocity of the own vehicle CR into filter data items corresponding to the preceding vehicles, and classifies filter data items having relative velocities having the opposite sign to that of the velocity of the own vehicle CR and having magnitudes smaller than the velocity of the own vehicle CR, into filter data items corresponding to the oncoming vehicles, and classifies filter data items having the opposite sign to that of the velocity of the own vehicle CR and having almost the same magnitude as the velocity of the own vehicle CR, into filter data items corresponding to the still objects.

Subsequently, in STEP S123, the signal processing unit 201 derives estimate values (such as estimates of longitudinal distances, estimates of relative velocities, and estimates of transverse distances) to be used in the next history peak extracting process (STEP S107). For example, the signal processing unit 201 specifies a predetermined number of filter data items having high priorities for controlling the vehicle CR, and calculates estimate peaks of UP peaks and DOWN peaks corresponding to the specified filter data items, and performs a history peak extracting process (STEP S107) using the calculated estimate peaks in the next process section of the processor 17. As for the priorities of the filter data items, in ACC, filter data items having transverse positions corresponding to a lane where the vehicle CR is running (hereinafter, also referred to as "own lane") and having relatively short longitudinal distances with respect to the vehicle CR have high priorities, and filter data items having transverse positions corresponding to lanes adjacent to the own lane of the vehicle CR and having relatively long transverse distances with respect to the vehicle CR have low priorities.

For example, the signal processing unit 201 performs the reverse process of the process of pairing UP peaks and DOWN peaks, thereby dividing the filter data items into UP peaks and DOWN peaks. Then, the signal processing unit 201 calculates estimate UP peaks using the frequency information items and angle information items of the UP peaks, and calculates estimate DOWN peaks using the frequency information items and angle information items of the DOWN peaks.

Subsequently, in STEP S125, from the filter data items calculated in the past processes, the signal processing unit 201 removes filter data items unnecessary to be output as target information items to the vehicle control device 2 (hereinafter, such filter data items will also be referred to as "data items unnecessary to be output"). Examples of data items unnecessary to be output include filter data items corresponding to targets unsuitable as targets of the vehicle control device 2. Also, examples of targets unsuitable as targets of the vehicle control device 2 include upper objects and lower objects as described above. Therefore, for example, from among filter data items having moving-object flags set to the OFF state (i.e., still-object pairs), the signal processing unit 201 removes filter data items corresponding to upper objects and filter data items corresponding to lower objects, as data items unnecessary to be output. Meanwhile, the signal processing unit 201 leaves filter data items having moving-object flags set to the ON state (i.e., moving-object pairs). Therefore, target information items relative to upper objects and lower objects which are targets unsuitable as targets of the vehicle control device 2 are not output from the target information output unit 204 to the vehicle control device 2. In other words, only target information items relative to targets suitable as targets of vehicle control device 2 are output from the target information output unit 204 to the vehicle control device 2. Examples of targets suitable as targets of the vehicle control device 2 include still objects other than upper objects and lower objects, moving objects, and so on. Also, for example, the signal processing unit 201 removes filter data items corresponding to ghost peaks caused by interference (intermodulation) between peaks corresponding to targets actually existing at positions spaced away from the radar device 1 by a predetermined distance or more and switching noise generated by a DC to DC converter of a power supply unit of the radar device 1.

Subsequently, in STEP S131, the signal processing unit 201 performs an "integrating process" of integrating a plurality of filter data items corresponding to one object into one filter data item. For example, in a case where the radar device 1 receives a plurality of signals reflected from a plurality of reflecting points of the same object, as reception signals, the signal processing unit 201 derives a plurality of filter data items having position information items different from each other, on the basis of the reception signals, respectively. However, since the plurality of derived filter data items is filter data items originally corresponding to one object, the signal processing unit 201 integrates the plurality of derived filter data items into one, such that the plurality of filter data items corresponding to the same object is treated as one filter data item. Therefore, for example, if a plurality of filter data items has almost the same relative velocity and has longitudinal distances and transverse distances in a predetermined range, the signal processing unit 201 considers the plurality of filter data items as filter data items relative to the same object, and integrates the plurality of filter data items into one filter data item corresponding to one object. The "integrating process" will also be referred to as a "grouping process" or "grouping".

Subsequently, in STEP S133, the target information output unit 204 selects a predetermined number of data groups from the data groups obtained by the integrating process of STEP S131, and outputs the selected data groups as target information items to the vehicle control device 2.

<Pairing Process>

Figure 9:
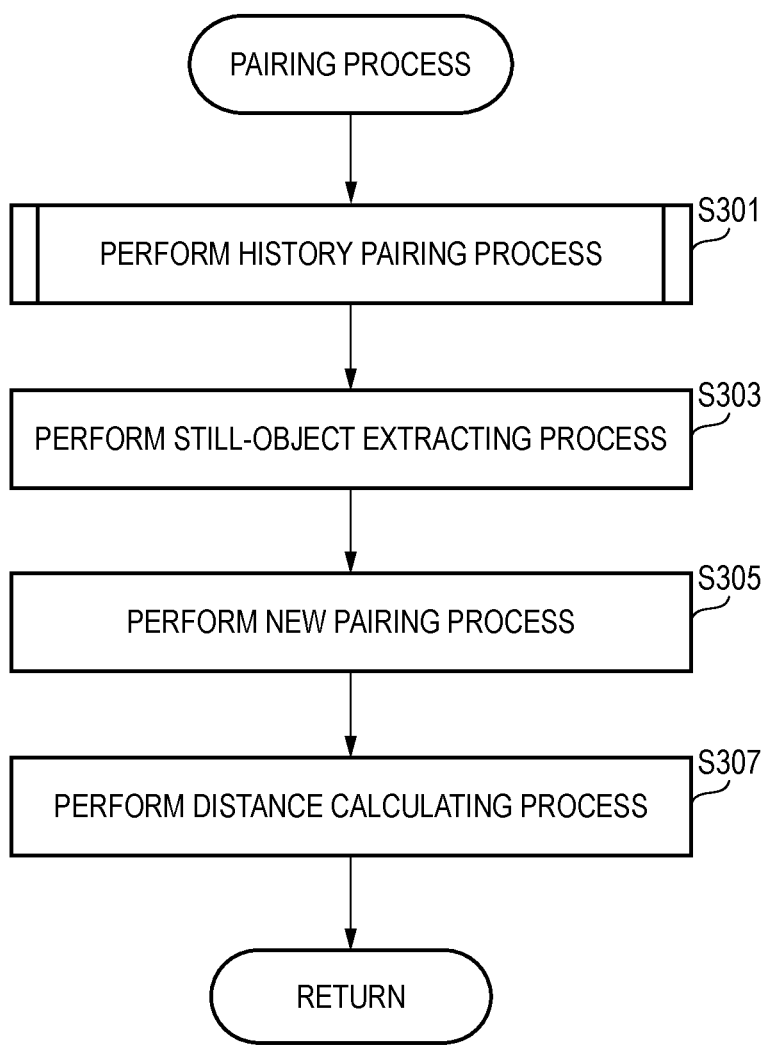
FIG. 9 is a flow chart for explaining an example of a pairing process according to the first embodiment of the present invention.

FIG. 9 is a flow chart available for explaining an example of the pairing process of the first embodiment. The series of steps of the pairing process shown in FIG. 9 corresponds to the process of STEP S113 shown in FIG. 6.

In FIG. 9, first, in STEP S301, the signal processing unit 201 calculates "history pairs" which are pair data items obtained by pairing the history UP peaks and the history DOWN peaks extracted by the history peak extracting process of STEP S107.

Figure 10:
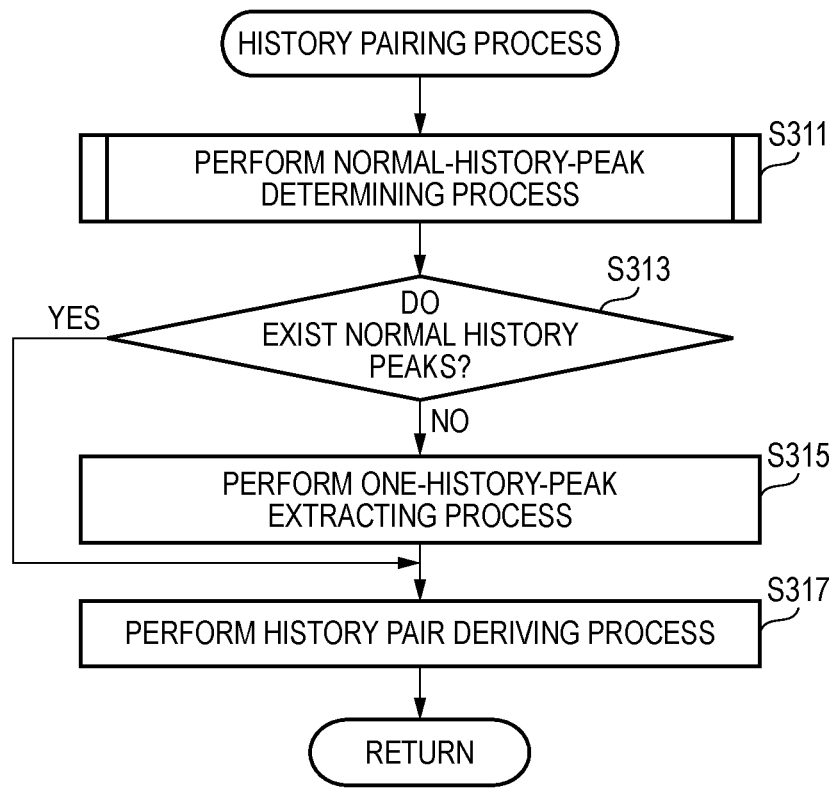
FIG. 10 is a flow chart for explaining an example of a history pairing process according to the first embodiment of the present invention.

Now, the history pairing process of STEP S301 will be described in more detail. FIG. 10 is a flow chart available for explaining an example of the history pairing process of the first embodiment.

In FIG. 10, in STEP S311, the signal processing unit 201 performs a "normal-history-peak determining process" of extracting history UP peaks and history DOWN peaks corresponding to the estimate UP peaks and the estimate DOWN peaks, respectively, from history peaks included in a predetermined frequency range.

Figure 11:
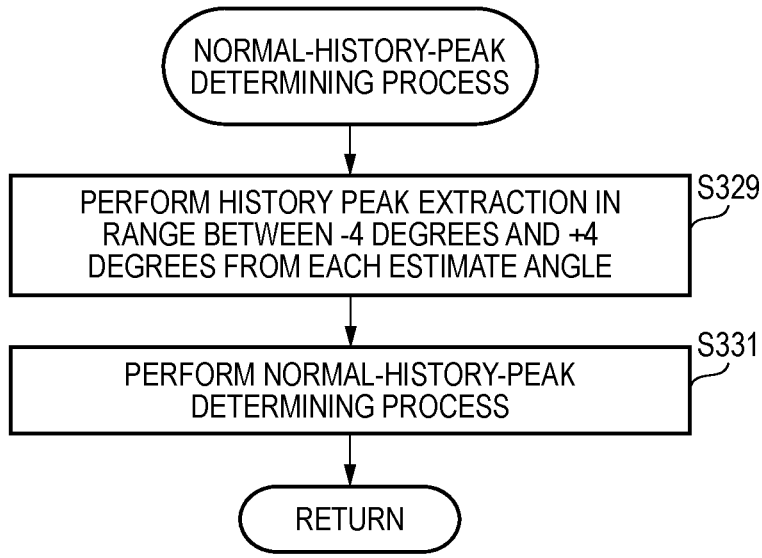
FIG. 11 is a flow chart for explaining an example of a normal-history-peak determining process according to the first embodiment of the present invention.

FIG. 11 is a flow chart available for explaining the normal-history-peak determining process of the first embodiment.

In FIG. 11, in STEP S329, the signal processing unit 201 calculates the differences between angles derived from the history peak and angles derived from the estimate peaks (hereinafter, also referred to as "estimate angles"), and extracts history peaks having angle differences of 4 degrees or less, from the history peaks extracted by STEP S107. For example, the signal processing unit 201 derives the angles, by performing a process similar to the above-described azimuth calculation, using the history UP peaks extracted by STEP S107. Then, the signal processing unit 201 compares the derived angles with the estimate angles derived from the estimate angles derived from the estimate UP peaks, and extracts history UP peaks having the angle differences between them in a range of ±4 degrees (hereinafter, such history UP peaks will also be referred to as "normal history UP peaks"). Also, even with respect to the history DOWN peaks, similarly to the history UP peaks, the signal processing unit 201 compares the angles derived from the history DOWN peaks with the estimate angles derived from the estimate DOWN peaks, and extracts history DOWN peaks having the differences of 4 degrees or less (hereinafter, such history DOWN peaks will also be referred to as "normal history DOWN peaks"). Hereinafter, "normal history UP peaks" and "normal history DOWN peaks" will also be collectively referred to as "normal history peaks". Hereinafter, the process of STEP S329 will be described in more detail.

Figure 12:
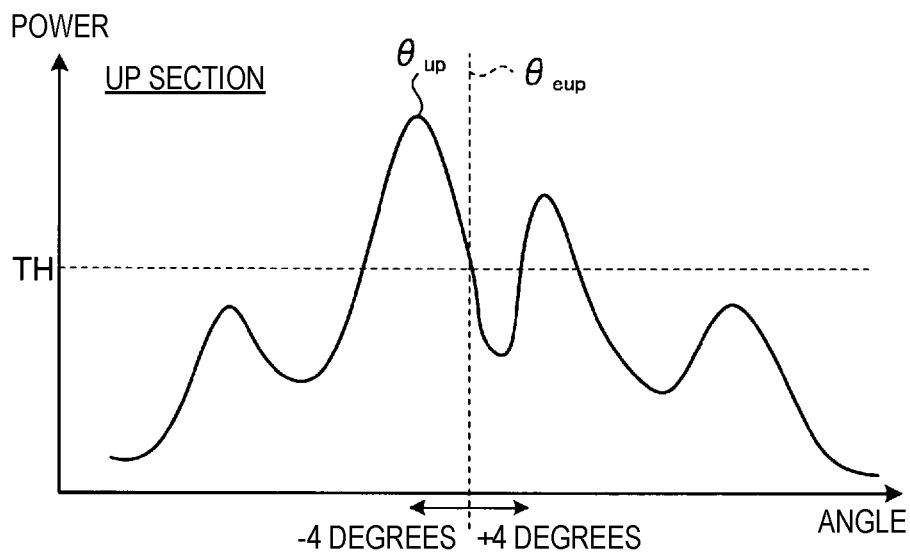
FIG. 12 is a view for explaining another operation example of the signal processing unit according to the first embodiment of the present invention.
Figure 13:
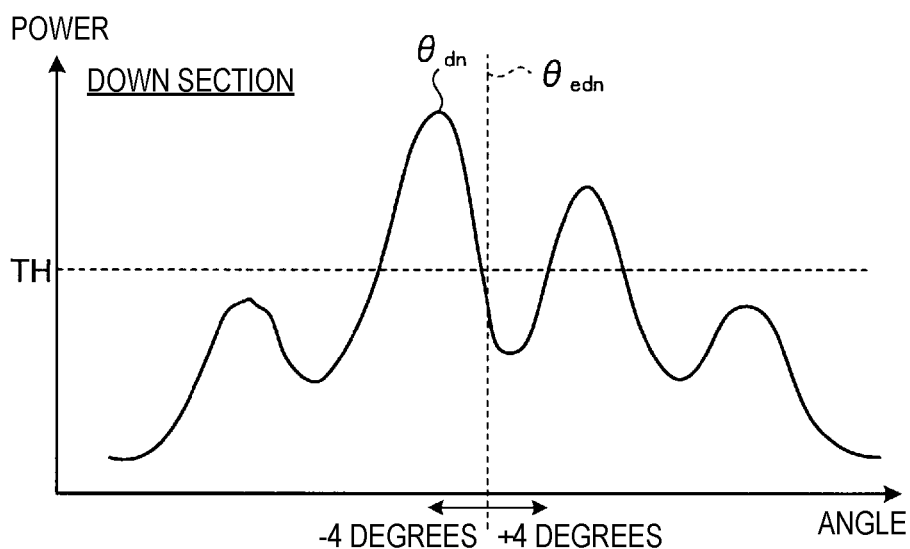
FIG. 13 is a view for explaining the operation example of the signal processing unit according to the first embodiment of the present invention.

FIGS. 12 and 13 are views available for explaining an operation example of the signal processing unit of the first embodiment. The signal processing unit 201 derives angles θup by azimuth calculation based on history UP peaks fup extracted by the process of STEP S107. FIG. 12 shows an angle spectrum derived from a history UP peak fup. In FIG. 12, the signal processing unit 201 determines whether any angle θup having power equal to or larger than a threshold TH is included in a range of ±4 degrees from an estimate angle θeup. In a case where an angle θup having power equal to or larger than the threshold TH is included in the range of ±4 degrees from the estimate angle θeup, the signal processing unit 201 determines the history UP peak fup as a normal history UP peak.

Similarly, the signal processing unit 201 derives angle θdn by azimuth calculation based on history DOWN peaks fdn extracted by the process of STEP S107. FIG. 13 shows an angle spectrum derived from the history DOWN peaks fdn. In FIG. 13, the signal processing unit 201 determines whether any angle θdn having power equal to or larger than the threshold TH is included in the range of ±4 degrees from an estimate angle θedn derived from an estimate DOWN peak. In a case where an angle θdn having power equal to or larger than the threshold TH is included in the range of ±4 degrees from the estimate angle θedn, the signal processing unit 201 determines the history DOWN peak fdn as a normal history DOWN peak.

Meanwhile, in a case where a plurality of angles θup having power equal to or larger than the threshold TH exists in the range of ±4 degrees with respect to the estimate angle θeup, the signal processing unit 201 determines a history UP peak corresponding to an angle θup closest to the estimate angle θeup, as a normal history UP peak. Similarly, in a case where a plurality of angles θdn having power equal to or larger than the threshold TH exists in the range of ±4 degrees with respect to the estimate angle θedn, the signal processing unit 201 determines a history DOWN peak corresponding to an angle θdn closest to the estimate angle θedn, as a normal history DOWN peak.

Referring to FIG. 11 again, in STEP S331, the signal processing unit 201 performs a "normal-history-peak determining process" of determining whether there are both of a normal history UP peak and a normal history DOWN peak, with respect to each estimate pair. For example, in a case where there are both of a normal history UP peak and a normal history DOWN peak satisfying the condition of STEP S329, the signal processing unit 201 determines that normal history peaks exist. In contrast, in a case where at least one of a normal history UP peak and a normal history DOWN peak satisfying the conditions of STEPS S327 and S329 does not exist, the signal processing unit 201 determines that normal history peaks do not exist.

Referring to FIG. 10 again, in a case where the signal processing unit 201 determines that normal history peaks exist, in the determination of STEP S331 ("Yes" in STEP S313), in STEP S317, the signal processing unit 201 derives a history pair by pairing the normal history UP peak and the normal history DOWN peak.

Meanwhile, in a case where the signal processing unit 201 determines that normal history peaks do not exist, in the determination of STEP S331 ("No" in STEP S313), the process proceeds to a "one-side-history-peak extracting process" of STEP S315.

In the present embodiment, in the normal-history-peak determining process of STEP S311, the signal processing unit 201 determines whether both of a normal history UP peak and a normal history DOWN peak exist. Therefore, in a case where the signal processing unit 201 determines that one of a normal history UP peak and a normal history DOWN peak does not exist, in STEP S331, it determines that normal history peaks do not exist, but holds the determination result representing that only one of a normal history UP peak and a normal history DOWN peak exists. Therefore, in the one-side-history-peak extracting process of STEP S315, from the result of the normal-history-peak determining process of STEP S311, the signal processing unit 201 extracts one existing normal history peak of a normal history UP peak and a normal history DOWN peak. Further, in STEP S315, in the case where one peak of a normal history UP peak and a normal history DOWN peak exists, the signal processing unit 201 determines that a one-side history peak exists, and sets a "one-side history pair flag" to an ON state; whereas in a case where both peaks do not exist, the signal processing unit determines that any one-side history peak does not exist, and sets the "one-side history pair flag" to an OFF state.

In a case where the signal processing unit 201 determines that a one-side history peak exist in STEP S315, the signal processing unit 201 derives a history pair, for example, by pairing the existing one side of a normal history UP peak and a normal history DOWN peak with the other side of the estimate DOWN peak and the estimate UP peak.

Referring to FIG. 9 again, after the signal processing unit 201 performs the history pairing process of STEP S301, in STEP S303, it performs a pairing process on the still-object peaks extracted by the still-object peak extracting process of STEP S109. In STEP S303, the signal processing unit 201 pairs the still-object UP peaks and the still-object DOWN peaks. The signal processing unit 201 performs pairing of the still-object UP peaks and the still-object DOWN peaks, in the same way as the pairing of the history UP peaks and the history DOWN peaks.

Subsequently, in STEP S305, the signal processing unit 201 pairs the remaining UP peaks and the remaining DOWN peaks. The signal processing unit 201 performs pairing of the remaining UP peaks and the remaining DOWN peaks in the same way as the pairing of the history UP peaks and the history DOWN peaks. Pair data items of the remaining UP peaks and the remaining DOWN peaks correspond to new pairs described above.

Subsequently, in STEP S307, the signal processing unit 201 calculates longitudinal distances, relative velocities, angles, transverse distances, and the like on the basis of the pair data items derived by the above-described individual pairing processes. In a case of calculating longitudinal distances, relative velocities, angles, transverse distances, and the like on the basis of the pair data items obtained by the pairing of the still-object extracting process of STEP S303 or the pair data items obtained by pairing of the new pairing process of STEP S305, the signal processing unit 201 can calculates them in the same way as that in the case of using Expressions 1 to 3.

Also, in a case of calculating long diameters, relative velocities, angles, transverse distances, and so on, on the basis of the pair data items obtained by pairing of the history pairing process of STEP S301, the signal processing unit 201 calculates them in the following way.

Specifically, first, the signal processing unit 201 extracts history pairs having one-side history pair flags set to the ON state. Since one peak of two peaks included in a history pair having a one-side history pair flag set to the ON state is a normal history UP peak or a normal history DOWN peak, the other peak is either one of a history DOWN peak and a history UP peak or one of an estimate DOWN peak and an estimate UP peak.

Subsequently, the signal processing unit 201 determines whether a priority same-lane preceding-vehicle status flag of each extracted history pair is in an ON state.

In a case where the priority same-lane preceding-vehicle status flag of a history pair is in the ON state, the signal processing unit 201 determines whether FFT data item peaks (hereinafter, also referred to as "FFT peaks") corresponding to the peaks of the history pair exist. If FFT peaks exist, the signal processing unit calculates a distance and so on using the FFT peaks. For example, in a case where the history pair is composed of a normal history UP peak and a history DOWN peak, the signal processing unit 201 calculates a distance, a relative velocity, and so on using the FFT peak of the normal history UP peak and the FFT peak of the history DOWN peak. Also, since the history DOWN peak has no angle information item, the signal processing unit 201 derives the angle of the normal history UP peak, as the angle of the history pair. The calculation of the distance and so on using the FFT peaks can be performed by Expressions 1 to 3. In other words, the signal processing unit 201 uses the frequency of the FFT peak of the normal history UP peak and the frequency of the FFT peak of the history DOWN peak as fup and fdn in Expressions 1 and 2, respectively. Also, the signal processing unit 201 uses the angle derived from the normal history UP peak as θup in Expression 3, but does not use θdn in Expression 3.

Meanwhile, in a case where FFT peaks corresponding to the peaks of a history pair having a priority same-lane preceding-vehicle status flag set to the ON state do not exist, since one of the two peaks included in the history pair is an estimate peak, the signal processing unit 201 calculates a distance and so on using estimate peaks. For example, in a case where the history pair is composed of a normal history UP peak and an estimate DOWN peak, the signal processing unit 201 calculates a distance and a relative velocity using the FFT peak of the normal history UP peak and the estimate peak. Also, the signal processing unit 201 can also calculate an estimate angle from the estimate DOWN peak; however, it is also possible to derive the angle of the normal history UP peak as the angle of the history pair. The calculation of the distance and so on using the estimate peaks can be performed by Expressions 1 to 3. In other words, the signal processing unit 201 uses the frequency of the FFT peak of the normal history UP peak and the frequency of the FFT peak of the estimate DOWN peak as fup and fdn in Expressions 1 and 2, respectively. Also, the signal processing unit 201 uses the angle derived from the normal history UP peak as θup in Expression 3, but does not use θdn in Expression 3.

Although the case where a one-side history peak exists has been described above, for example, in a case where there is neither normal history peaks nor a one-side history peak, estimate peaks of the UP section and the DOWN section may be used to calculate the distance, the relative velocity, and the angle.

<Moving-Object Determining Process>

FIGS. 14 to 17 are available for explaining an operation example of the signal processing unit of the first embodiment.

Figure 14:
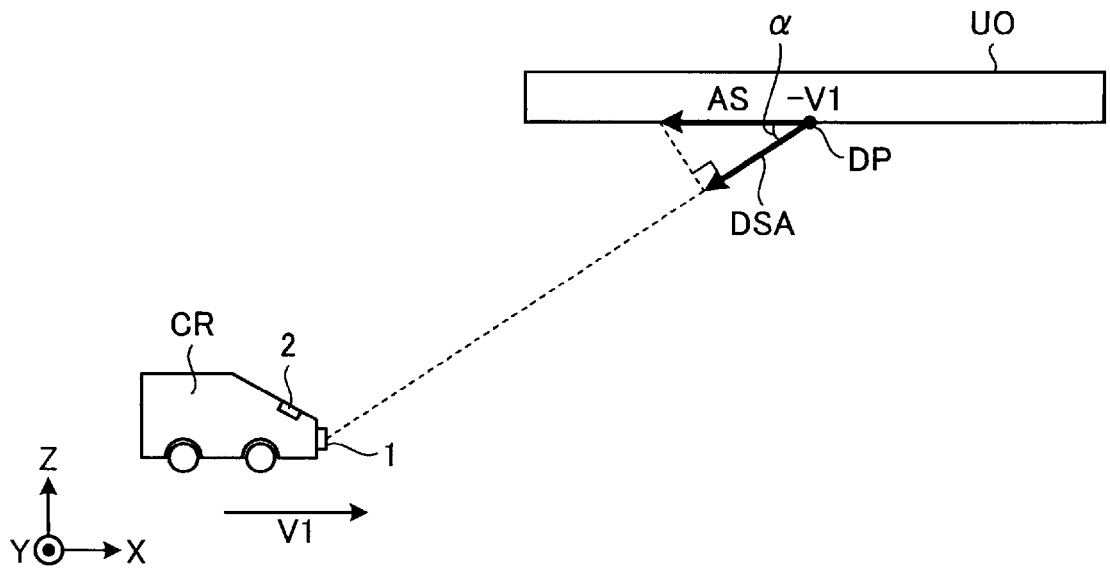
FIG. 14 is a view for explaining a further operation example of the signal processing unit according to the first embodiment of the present invention.

In FIG. 14, the vehicle CR equipped with the radar device 1 (hereinafter, referred to simply as the own vehicle) detects a target DP related to an upper object UO. The upper object UO is a still object. Therefore, in this case, the target DP related to the object having a relative velocity having almost the same magnitude as that of the own vehicle velocity V1 of the own vehicle CR is expected to be detected. At the time point of FIG. 14, the actual relative velocity AS of the target DP related to the upper object UO relative to the vehicle CR is −V1 (AS=−V1). Hereinafter, the actual relative velocity of the upper object UO relative to the vehicle CR will also be referred to as the "actual relative velocity". Meanwhile, since the vehicle CR is at a position lower than the upper object UO, the relative velocity DSA of the target DP related to the upper object UO which is detected at the time point of FIG. 14 by the signal processing unit 201 is −V1·cos α (DSA=−V1·cos α). Hereinafter, the relative velocity of the upper object UO relative to the vehicle CR which is detected by the radar device 1 will also be referred to as the detected relative velocity. Therefore, between the magnitude V1 of the velocity of the vehicle CR and the magnitude of the detected relative velocity DSA (i.e., V1·cos α), a difference occurs. For this reason, the signal processing unit 201 erroneously recognizes the target DP related to the upper object UO as a target related to a moving object, not as a target of a still object. Therefore, even though the upper object UO is a still object, the signal processing unit 201 sets the moving-object flag of pair data items corresponding to the upper object UO to the ON state. In other words, the target DP related to the upper object UO is erroneously recognized as a target related to a moving object, not as a target related to a still object. Therefore, in this case, since target information items on the target DP related to the upper object UO are not removed in the unnecessary-object removing process of the STEP S125, the target information items on the upper object UO are output, as target information items related to a moving object, from the target information output unit 204 to the vehicle control device 2. As a result, erroneous control may be performed. For example, follow-up control may be erroneously performed such that the vehicle CR follows the upper object.

Figure 15:
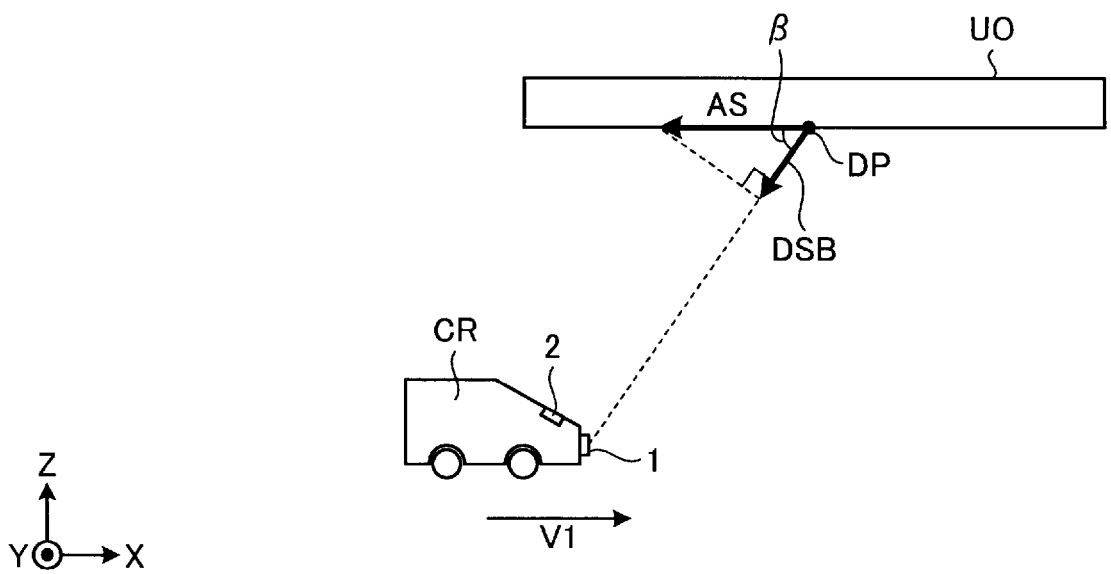
FIG. 15 is a view for explaining the further operation example of the signal processing unit according to the first embodiment of the present invention.

FIG. 15 shows a situation in which the vehicle CR maintains the velocity V1 and is closer to the target DP as compared to the situation of FIG. 14. In FIG. 15, since the vehicle CR maintains the velocity V1 and is closer to the target DP, the actual relative velocity AS is maintained at −V1 (AS=−V1), and the actual relative velocity and the detected relative velocity form an angle β larger than an angle α of FIG. 14. As a result, the relative velocity DSB which is detected at the time point of FIG. 15 by the signal processing unit 201 is −V·cos β (DSB=−V·cos β). In other words, the relative velocity DSB becomes smaller than the relative velocity DSA (DSB<DSA). Therefore, in FIG. 15, the difference between the magnitude of the velocity of the vehicle CR and the magnitude of the detected relative velocity becomes larger than that of FIG. 14. Therefore, in the situation of FIG. 15, the probability that the signal processing unit 201 sets the moving-object flag of the target DP related to the upper object UO to the ON state is higher than that in the situation of FIG. 14.

In contrast, since the beam patterns NA of the transmission signals TX have a constant beam width in the vertical direction, in the case where an object is the upper object UO, the signal levels of reception signals which are input from the target DP by reflection of the transmission signal from the target DP in the situation of FIG. 15 are lower than those in the situation of FIG. 14.

Figure 16:
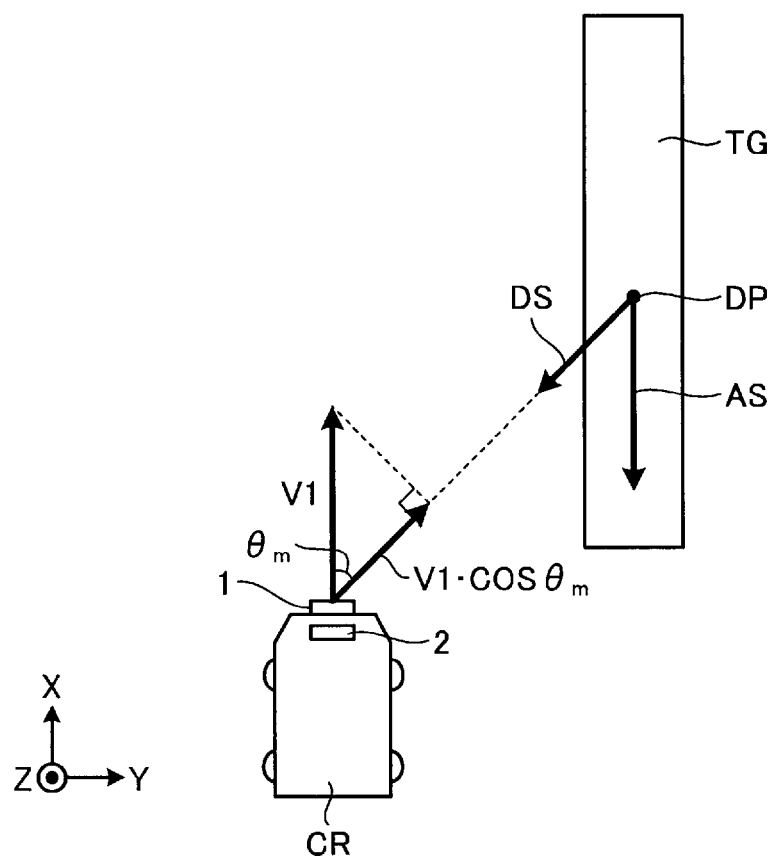
FIG. 16 is a view for explaining the further operation example of the signal processing unit according to the first embodiment of the present invention.

Also, in the case where an object is the upper object UO, the "ground velocity" (to be described below) in the situation of FIG. 15 is higher than that in the situation of FIG. 14. FIG. 16 is a view as seen from above of the vehicle CR in the vertical direction, and in FIG. 16, the vehicle CR is running by an object TG at the velocity V1 similarly in FIGS. 14 and 15. Therefore, in FIG. 16, similarly in FIGS. 14 and 15, the actual relative velocity AS is −V1 (AS=−V1).

In this case, when the horizontal angle of a target DP relative to the radar device 1 is θm, the "ground velocity" is a velocity which can be defined by Expression 5, and corresponds to the sum of a target-direction velocity component obtained by decomposing the own vehicle velocity of the own vehicle CR and a vehicle-direction velocity component obtained by decomposing the velocity of the target.

Ground Velocity GS=(Own Vehicle Velocity)·cos θm+(Detected Relative Velocity DS)  (5)

Therefore, in a case where the object TG shown in FIG. 16 is a still object existing at the same height as that of the vehicle CR, the ground velocity GS is maintained at 0 (zero).

Meanwhile, if the idea of derivation of the ground velocity GS in the horizontal direction is applied to the vertical direction, in a case where the object TG shown in FIG. 16 is the upper object UO shown in FIGS. 14 and 15, the detected relative velocity DS in FIG. 14 is DSA (DS=DSA=−V·cos α), and the detected relative velocity DS in FIG. 15 is DSB (DS=DSB=−V·cos β). Therefore, in the situation of FIG. 15, the ground velocity GS which can be expressed by Expression 5 increases relative to that in the situation of FIG. 14. In this case, on the basis of the integrated value of the reception level of a reception signal from the target and the integrated value of the ground velocity of the target, the signal processing unit 201 determines whether the target is related to an upper object, as follows.

Figure 17:
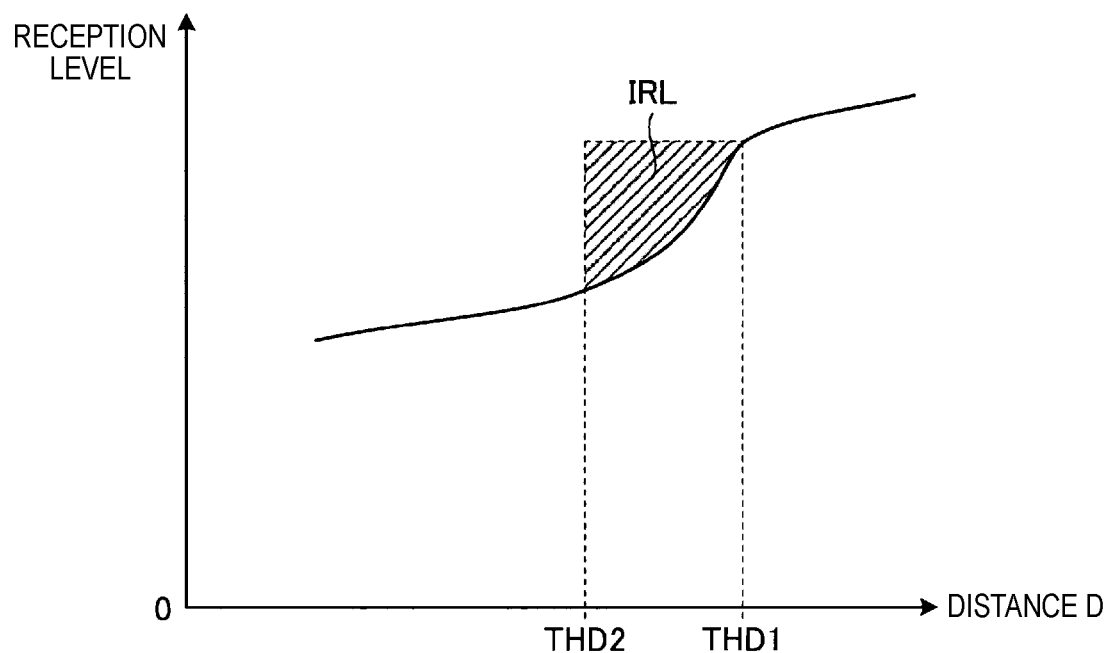
FIG. 17 is a view for explaining the further operation example of the signal processing unit according to the first embodiment of the present invention.
Figure 17:
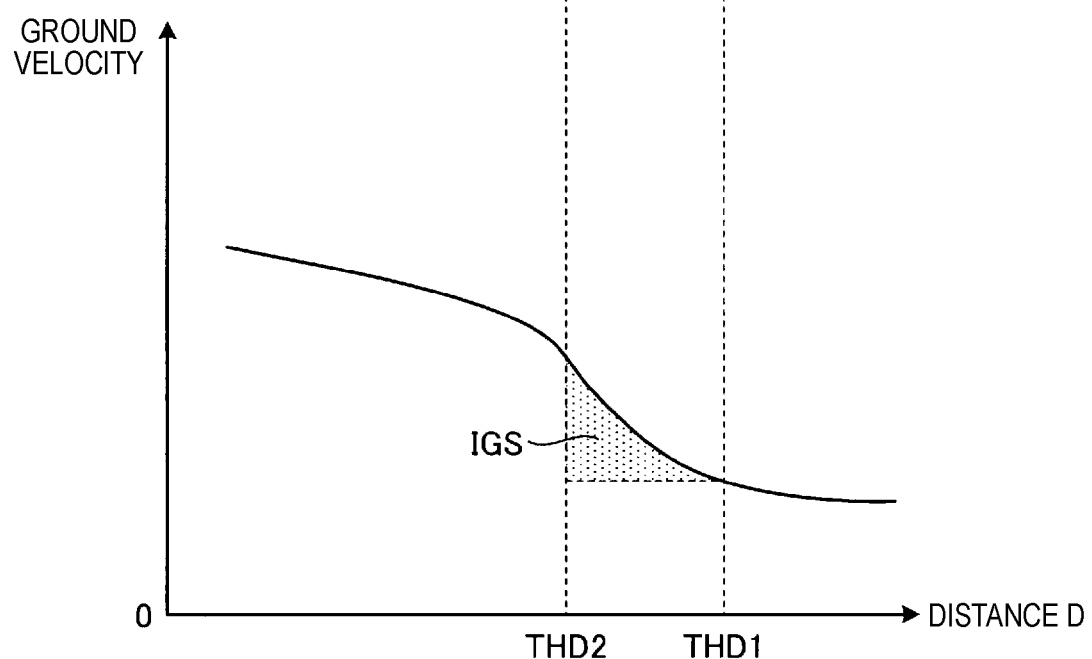

In other words, in a situation where the distance D between the radar device 1 and the target decreases, as shown in FIG. 17, when the distance D is in a range from a threshold THD1 to a threshold THD2 (THD1>THD2), in each process (i.e., in each processor process section of FIG. 4), the signal processing unit 201 integrates the reception level of a reception signal from the target, and integrates the ground velocity of the target. When the distance D further decreases to the threshold THD2, the signal processing unit 201 calculates an integrated value IRL of the reception level and an integrated value IGS of the ground velocity. For example, the signal processing unit 201 sets the reception level which is obtained when the distance D reaches the threshold THD1, as a reference reception level. In other words, the signal processing unit 201 sets the reception level corresponding to a distance at which calculation of the integrated value of the reception level starts, as a reference level. Also, when the distance D is in the range from the threshold THD1 to the threshold THD2, in each process, the signal processing unit 201 cumulatively adds a decrease amount in instantaneous value of the reception level with respect to the reference reception level (i.e., a value obtained by subtracting the instantaneous value of the reception level from the reference reception level), thereby performing integration of the reception level, that is, calculation of the integrated value of the reception level (hereinafter, also referred to as the "integrated reception level").

Also, for example, the signal processing unit 201 sets the ground velocity which is obtained when the distance reaches the threshold THD1, as a reference ground velocity. In other words, the signal processing unit 201 sets the ground velocity corresponding to a distance at which calculation of the integrated value of the ground velocity starts, as a reference ground velocity. Also, when the distance D is in the range from the threshold THD1 to the threshold THD2, in each process, the signal processing unit 201 cumulatively adds an increase amount in instantaneous value of the ground velocity (i.e., a value obtained by subtracting the instantaneous value of the ground velocity from the reference ground velocity), thereby performing integration of the ground velocity, that is, calculation of the integrated value of the ground velocity (hereinafter, also referred to as the "integrated ground velocity"). For example, the threshold THD1 is 60 m, and the threshold THD2 is 40 m. Also, for example, distances corresponding to points of graphs of the signal level and the ground velocity at which the slopes of the tangents vary by a predetermined value or more may be set as the thresholds THD1 and THD2, respectively.

Figure 18:
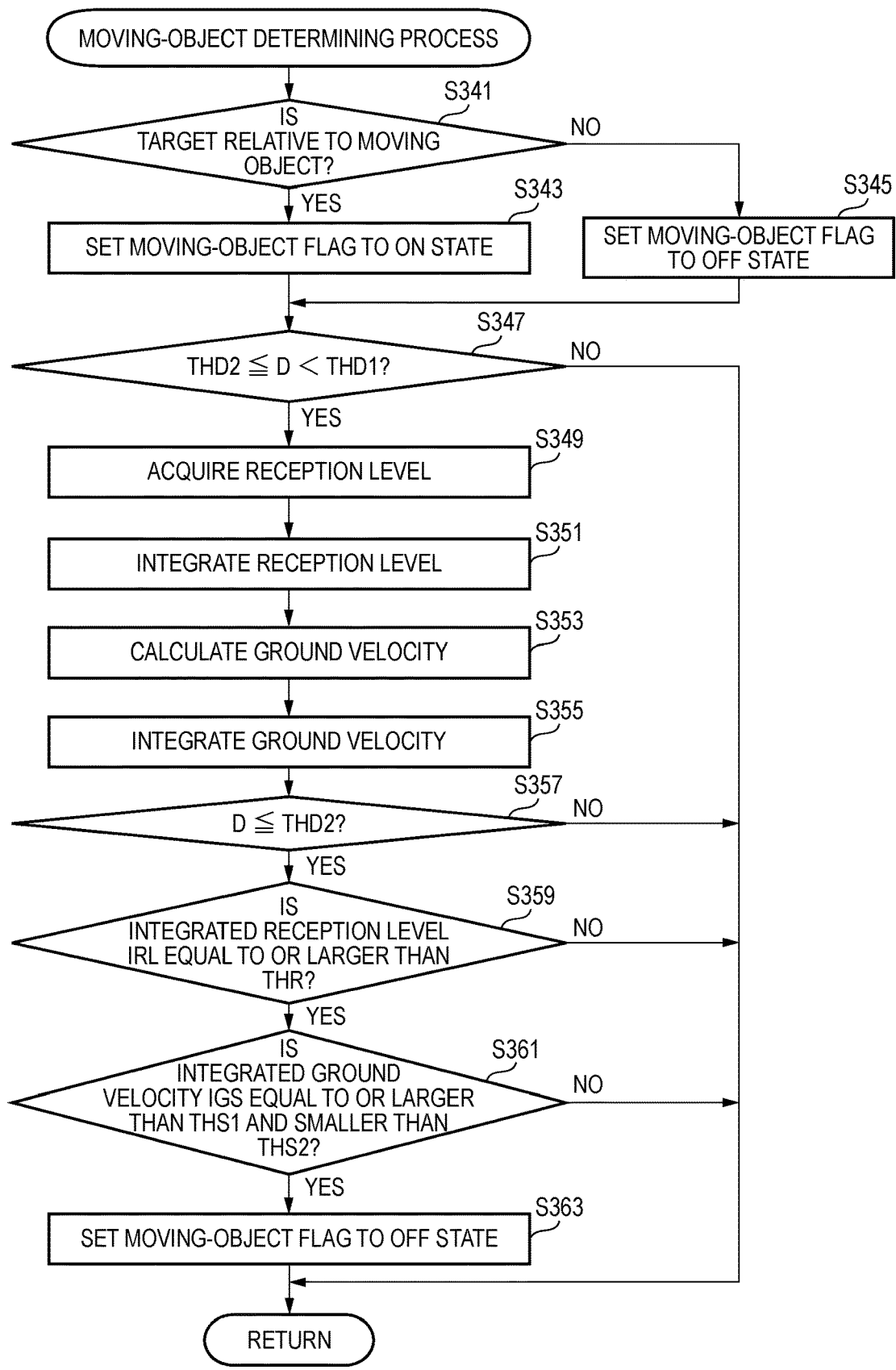
FIG. 18 is a flow chart for explaining an example of a moving-object determining process according to the first embodiment of the present invention.

In this case, on the basis of the integrated reception level IRL and the integrated ground velocity IGS which is calculated when the distance D reaches the threshold THD2, the signal processing unit 201 determines whether the target is related to an upper object, as follows. FIG. 18 is a flow chart available for explaining an example of the moving-object determining process of the first embodiment.

In FIG. 18, in STEP S341, the signal processing unit 201 determines whether the target is related to a moving object (i.e., whether the target is a target related to a moving object or a target related to a still object). In a case where the magnitude of the absolute value of the ground velocity GS calculated from the target is larger than a threshold, the signal processing unit 201 determines that the target is related to a moving object; whereas in a case where the magnitude of the absolute value of the ground velocity is equal to or smaller than the threshold, the signal processing unit determines that the target is related to a still object. The threshold for the magnitude of the absolute value of the ground velocity GS is ideally 0 (zero); however, it is preferable that the threshold be set to an appropriate value according to the usage environment of the radar device 1 and so on. In the case of determining that the target is related to a moving object ("Yes" in STEP S341), in STEP S343, the signal processing unit 201 sets the moving-object flag of the target to the ON state. Meanwhile, in the case of determining that the target is related to a still object ("No" in STEP S341), in STEP S345, the signal processing unit sets the moving-object flag of the target to the OFF state.

Subsequently, in STEP S347, the signal processing unit 201 determines whether the distance D is in a range smaller than the threshold THD1 and equal to or larger than the threshold THD2 (i.e., a range from the threshold THD1 to the threshold THD2) in a situation in which the distance D between the radar device 1 and the target decreases. For example, as described above, the threshold THD1 is 60 m, and the threshold THD2 is 40 m. In a case where the distance D is in the range from the threshold THD1 to the threshold THD2 ("Yes" in STEP S347), the process proceeds to STEP S349. Meanwhile, in a case where the distance D is not in the range from the threshold THD1 to threshold THD2 ("No" in STEP S347), the moving-object determining process finishes.

In other words, while the target is detected, in each process, the signal processing unit 201 repeatedly determines whether the target is a target of a moving object or a target of a still object. In a case where the distance D of the target is in a predetermined distance range, and the target has been determined as a target of a moving object (i.e. the moving-object flag of the target is in the ON state), the signal processing unit 201 repeatedly determines whether the target is a target of an upper object. Meanwhile, when the distance D of the target is out of the predetermined range, even though the moving-object flag of the target is in the ON state, the signal processing unit 201 does not perform determination on whether the target is a target of an upper object. As described above, the signal processing unit 201 performs a determining process considering the possibility that a target determined as a target of a moving object is a target of an upper object. In other words, with respect to a target determined as a target of a moving object, the signal processing unit 201 performs determination on whether that target was erroneously determined as a target of a moving object, only when the target is in a distance range in which it is possible to perform determination with relatively high accuracy. In this way, it is possible to accurately determine the types of object targets.

In STEP S349, the signal processing unit 201 acquires an instantaneous value of the reception level of the reception signal from the target.

Subsequently, in STEP S351, the signal processing unit 201 integrates the reception level as described above.

Subsequently, in STEP S353, the signal processing unit 201 calculates an instantaneous value of the ground velocity of the target by Expression 5.

Subsequently, in STEP S355, the signal processing unit 201 integrates the ground velocity as described above.

Subsequently, in STEP S357, the signal processing unit 201 determines whether the distance D has decreased to the threshold THD2, that is, whether the distance D is equal to or smaller than the threshold THD2. In a case where the distance D has reached the threshold THD2 ("Yes" in STEP S357), the process proceeds to STEP S359. Meanwhile, in a case where the distance D has not reached the threshold THD2 ("No" in STEP S357), the moving-object determining process finishes.

In STEP S359, the signal processing unit 201 determines whether the integrated reception level IRL calculated when the distance D reached the threshold THD2 is equal to or larger than a threshold THR, or not. In a case where the integrated reception level IRL is equal to or larger than the threshold THR ("Yes" in STEP S359), the process proceeds to STEP S361. Meanwhile, in a case where the integrated reception level IRL is smaller than the threshold THR ("No" in STEP S359), the moving-object determining process finishes. For example, in a case where the unit of the reception level is dBsm (decibel square meter), it is preferable that the threshold THR be set to 20 db.

In STEP S361, the signal processing unit 201 determines whether the integrated ground velocity IGS calculated when the distance D reached the threshold THD2 is equal to or larger than a threshold THS1 and smaller than a threshold THS2 (THS1<THS2), or not. In a case where the integrated ground velocity IGS is equal to or larger than the threshold THS1 and smaller than the threshold THS2 ("Yes" in STEP S361), the process proceeds to STEP S363. Meanwhile, in a case where the integrated ground velocity IGS is smaller than the threshold THS1, or equal to or larger than threshold THS2 ("No" in STEP S361), the moving-object determining process finishes. For example, in a case where the unit of the ground velocity is m/s, it is preferable that the threshold THS1 be set to −30 m/s and the threshold THS2 be set to 0 m/s.

The determinations of STEPS S359 and S361 correspond to determination on whether the target is related to an upper object. In other words, in a case where both of the conditions of STEPS S359 and S361 are satisfied, the signal processing unit 201 determines that the target is related to an upper object; whereas in a case where any one of the conditions of STEPS S359 and S361 is not satisfied, the signal processing unit 201 determines that the target is not related to an upper object.

If both of the conditions of STEPS S359 and S361 are satisfied, whereby the process proceeds to STEP S363, the signal processing unit 201 sets the moving-object flag of the target to the OFF state. Therefore, in a case where the target is related to an upper object, even if the target is erroneously determined as a target related to a moving object ("Yes" in STEP S341), whereby the moving-object flag of the target is set to the ON state (STEP S343), when the distance D reaches the threshold THD2, if the integrated reception level IRL is equal to or larger than the threshold THR ("Yes" in STEP S359), and the integrated ground velocity IGS is equal to or larger than the threshold THS1 and is smaller than the threshold THS2 ("Yes" in STEP S361), in STEP S363, the moving-object flag of the target is switched from the ON state to the OFF state. Therefore, in a case where the target is determined as a target related to an upper object by the determinations of STEPS S359 and S361, the moving-object flag is set to a correct state (in other words, the moving-object flag is set to the OFF state).

As described above, in the first embodiment, the radar device 1 has the signal processing unit 201 and the target information output unit 204. The radar device 1 transmits a transmission signal whose transmission frequency varies in the predetermined cycle, and receives a reception signal if the transmission signal is reflected from a target. Also, the radar device 1 acquires peaks of a frequency spectrum of a beat signal in UP sections and DOWN sections, and derives target information items on the basis of the UP peaks and the DOWN peaks. The target information output unit 204 outputs the target information items on the target to be used for the vehicle control device 2 to control the vehicle, to the vehicle control device 2. Therefore, the signal processing unit 201 uses not only the reception level of a reception signal from the target and a ground velocity obtained by one process but also the reception levels of reception signals from the target and ground velocities obtained by a plurality of processes, to determine whether the target is related to a moving object or related to an upper object. In other words, on the basis of the integrated values of the reception levels of reception signals related to a target, and the integrated values of ground velocities related to the target, the signal processing unit 201 serving as a determining unit determines whether the target is related to an upper object.

As described above, it is possible to accurately determine the types of targets on the basis of the levels of reception signals and ground velocities obtained with respect to the targets by a plurality of processes. Also, since it is possible to accurately determine the types of targets, it is possible to prevent malfunction of the vehicle control device 2.

Second Embodiment

In a second embodiment, a process which is performed if a target is once determined as a target related to an upper object since both of the conditions of STEPS S359 and S361 are satisfied, that is, a process which is performed if the moving-object flag of the target is switched from the ON state to the OFF state will be described.

For example, in a case where one of the following first and second conditions in a situation where the ground velocity of a target is equal to or larger than the own vehicle velocity, the signal processing unit 201 determines that the target is related to an object other than an upper object. In the first and second conditions, for example, as described above, the threshold THD2 is 40 m, and the reference reception level is a reception level when the distance D reaches the threshold THD1, and the threshold THD1 is 60 m. Also, in the second condition, a threshold THD3 is smaller than the threshold THD2, and is, for example, 30 m.

<First Condition>

The first condition is a condition in which the distance D should be smaller than the threshold THD2 and a value which is obtained by subtracting the reference reception level from an instantaneous value of the reception level acquired in a current process should be larger than 2 db.

<Second Condition>

The second condition is a condition in which the distance D should be smaller than the threshold THD3 and a value which is obtained by subtracting the reference reception level from an instantaneous value of the reception level acquired in a current process should be larger than 0 db.

In the second embodiment, a case where the first condition or the second condition is satisfied corresponds to a case where the reception level of the reception signal from the target tends to increase.

In other words, in the second embodiment, after the target is determined as a target of an upper object, when the reception level of the reception signal relative to the target tends to increase, the signal processing unit 201 determines that the target is related to an object (for example, a moving object such as a preceding vehicle) other than an upper object.

Even if a target related to a moving object is erroneously determined as a target related to an upper object in the first embodiment, in the above-described way, it is possible to re-determine whether the target is related to an upper object. Therefore, it is possible to improve the accuracy of determination on whether a target is related to an upper object.

Third Embodiment

Main upper objects which the radar device 1 mounted on the vehicle CR should detect are road signs. According to the home page of the Ministry of Land, Infrastructure, Transport and Tourism of Japan (a URL "http://www.mlit.go.jp/road///sign/sign/douro/setting01.htm"), road sign installation methods are classified into four types, that is, a roadside type, a cantilever type (an overhang type), a gate type (an overhead type), and an addition type.

The roadside type methods mean methods of attaching a sign plate to one or more support poles and installing the at least support pole at an end of a road, the center of a road, a sidewalk, or a median strip, other than the cantilever type methods and the gate type methods. The cantilever type methods mean methods of installing a pole at an end of a road, a sidewalk, a median strip, or the like such that a part of the pole overhangs a roadway and installing a sign plate on the overhanging part. The gate type methods mean methods of installing a sign plate over a roadway by a gate-like support pole crossing the roadway. Also, the addition type methods mean methods of installing a sign plate using a facility installed for a different purpose. In the address type, for example, sign plates are installed on pedestrian bridges, telephone poles, traffic lights, and so on.

Therefore, in all of the installation methods of the roadside type, the cantilever type, the gate type, and the addition type, sign plates are installed so as to be supported on support poles. In a case where an installation method is the addition type, pedestrian bridges and telephone poles can used as support poles for supporting sign plates, and support poles supporting traffic lights can be used as support poles for supporting sign plates.

Hereinafter, poles supporting sign plates will also be referred to as "lags" of still objects.

<Functions of Processor>

Similarly in the first embodiment (FIG. 5), the processor 17 has the signal processing unit 201, the transmission control unit 202, the signal generating unit 203, and the target information output unit 204, as functions of the processor 17. The processor 17 of the third embodiment further performs the following process, in addition to the processes of the first embodiment.

<Process of Radar Device>

Figure 19:
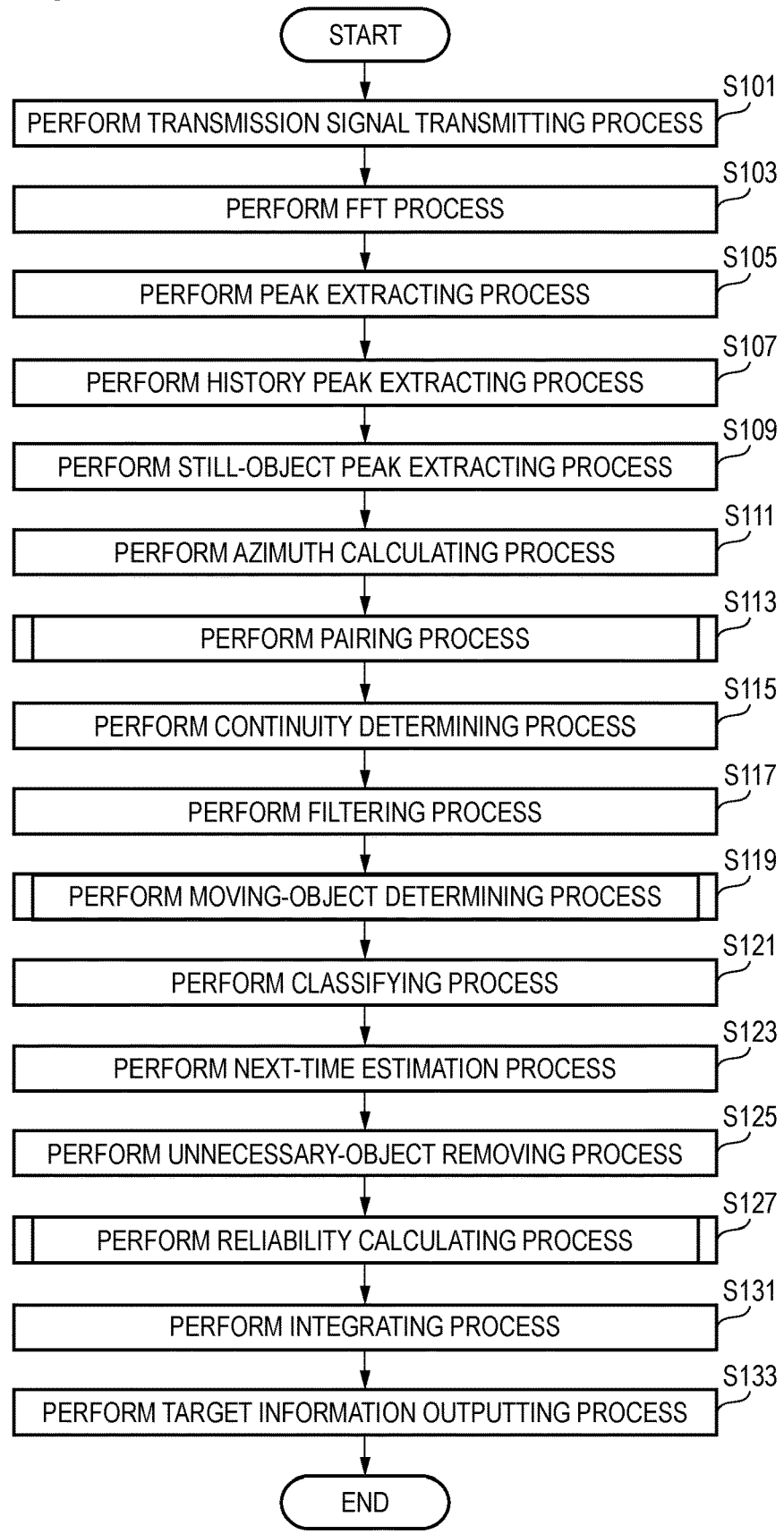
FIG. 19 is a flow chart for explaining an example of a process of a radar device according to a third embodiment of the present invention.

FIG. 19 is a flow chart available for explaining an example of a process of the radar device of the third embodiment.

After performing the unnecessary-object removing process of STEP S125, in STEP S127, the signal processing unit 201 performs a reliability calculating process. In STEP S127, with respect to each target derived in a current process, the signal processing unit 201 calculates the reliability of the target, and assigns weights to the reliability calculated with respect to the target and the reliability of the target derived in the previous process, and them adds them. Hereinafter, the reliability of a target obtained by weighting and adding will also be referred to as the "total reliability". Here, the reliability of a target is an index representing whether the target information items of that target are suitable as target information items to be output to the vehicle control device 2 (that is, whether the target information items are suitable or unsuitable), and target information items of targets having higher reliability are considered as being more suitable as target information items to be output to the vehicle control device 2. In other words, targets having relatively high reliability are targets related to objects with which the own vehicle CR will collide if running in the traveling direction. Also, targets having relatively low reliability are targets related to objects with which the own vehicle CR will not collide even if running in the traveling direction.

For example, targets corresponding to stopped vehicles and preceding vehicles running at velocities lower than that of the own vehicle CR are targets having relatively high reliability, and targets corresponding to upper objects and lower objects are targets having relatively low reliability. Therefore, the radar device 1 preferentially outputs target information items of targets having relatively high reliability to the vehicle control device 2. Hereinafter, the reliability of a target will also be referred to as a "confidence level".

Here, the reliability of a target means an information item on the type of the target. Specifically, the reliability of a target of an object is a value usable to determine whether that target is related to a stopped vehicle or a low-velocity vehicle (a preceding vehicle running at a velocity lower than that of the own vehicle CR) or a target related to an upper object, on the basis of a plurality of parameters of the target. In a plurality of scanning processes of the radar device 1, in a case where the reliability of a target is equal to or larger than a predetermined value, it is determined that an object relative to that target is a stopped vehicle or a low-velocity vehicle. Also, in a plurality of scanning processes of the radar device 1, in a case where the reliability of a target is smaller than the predetermined value, it is determined that an object relative to that target is an upper object. This determination makes it possible to accurately determine whether an object relative to a target is an object with which the own vehicle CR will collide if running in the traveling direction.

In STEP S133, the target information output unit 204 further performs the following process, in addition to the process of the first embodiment. Specifically, the target information output unit 204 selects data groups having total reliability equal to or larger than a threshold value, from the data groups obtained by the integrating process of STEP S131, and outputs the selected data groups as target information items to the vehicle control device 2. In other words, the target information output unit 204 outputs only target information items of targets having total reliability equal to or larger than the threshold to the vehicle control device 2, and does not output target information items of targets having total reliability smaller than the threshold. Alternatively, as total reliability which is calculated after the integrating process, for example, the average value of the total reliability relative to a plurality of filter data items subjected to the integration may be used.

<Reliability Calculating Process>

Figure 20:
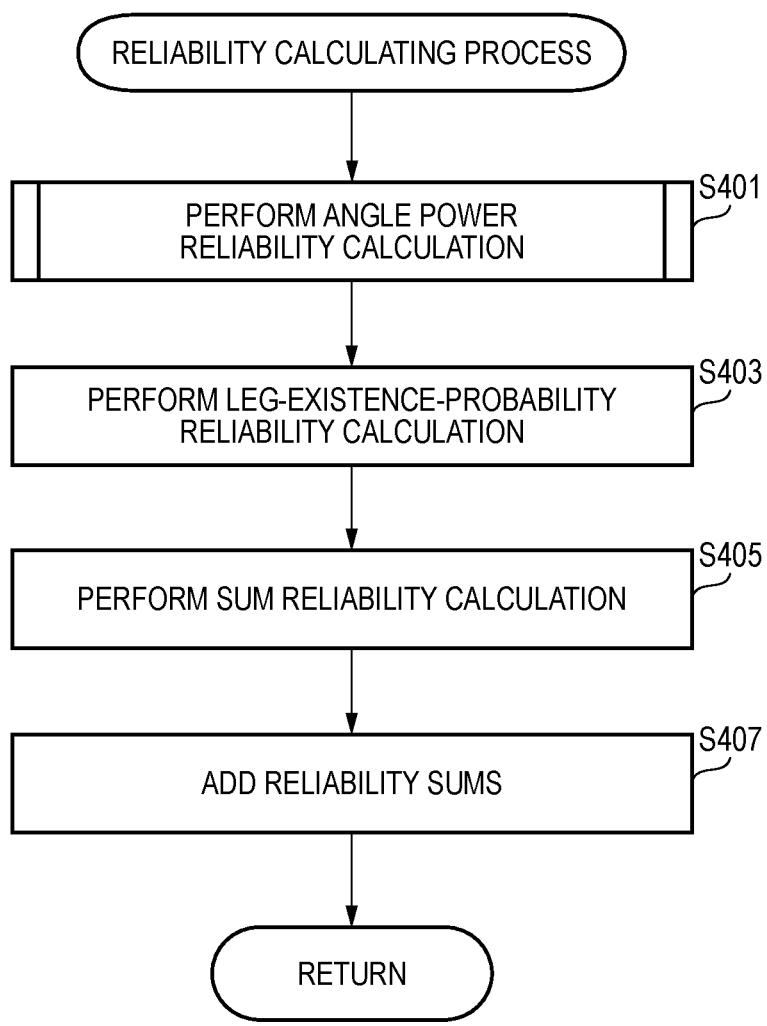
FIG. 20 is a flow chart for explaining an example of a reliability calculating process according to the third embodiment of the present invention.

FIG. 20 is a flow chart available for explaining an example of the reliability calculating process of the third embodiment.

In STEP S401, the signal processing unit 201 calculates the reliability of the power of the angle spectrum of each target (i.e., angle power reliability). For example, as the angle spectrum power is higher, the signal processing unit 201 calculates the angle power reliability having a larger value.

Subsequently, in STEP S403, with respect to each target, the signal processing unit 201 calculates a probability that legs of still objects exist in a predetermined area, (hereinafter, also referred to as a "leg existence probability"), and calculates the reliability of the corresponding target on the basis of the calculated leg existence probability. Hereinafter, the reliability calculated on the leg existence probability will also be referred to as "leg-existence-probability reliability". Also, hereinafter, legs of still objects existing on the front right side from the own vehicle CR will also be referred to as "right legs", and legs of still objects existing on the front left side from the own vehicle CR will also be referred to as "left legs".

Subsequently, in STEP S405, with respect to each target, the signal processing unit 201 calculates the sum of reliability by adding the angle power reliability calculated in STEP S401 and the leg-existence-probability reliability calculated in STEP S403.

Subsequently, in STEP S407, with respect to each target, the signal processing unit 201 calculates total reliability by assigning weights to the sum of reliability calculated in the current process and the sums of reliability calculated in the past processes and adding the weighted sums.

As described above, the reliability of each target is calculated by reliability processing based on parameters other than the reliability calculated in leg-existence-probability reliability processing. For example, reliability is calculated on the basis of the magnitude of a reception signal related to a target, and weights are assigned to current reliability and past reliability, and the weighted current reliability and the weighted past reliability are added. As described above, on the basis of various parameters of a target, a plurality of levels of reliability is calculated, and if the sum of them is equal to or higher than a predetermined level (for example, a reliability level of 91%), the target is determined as a target related to a stopped vehicle. Meanwhile, in a case where the sum is lower than the predetermined level, the target is determined as a target related to an upper object.

<Leg-Existence-Probability Reliability Calculating Process>

Figure 21:
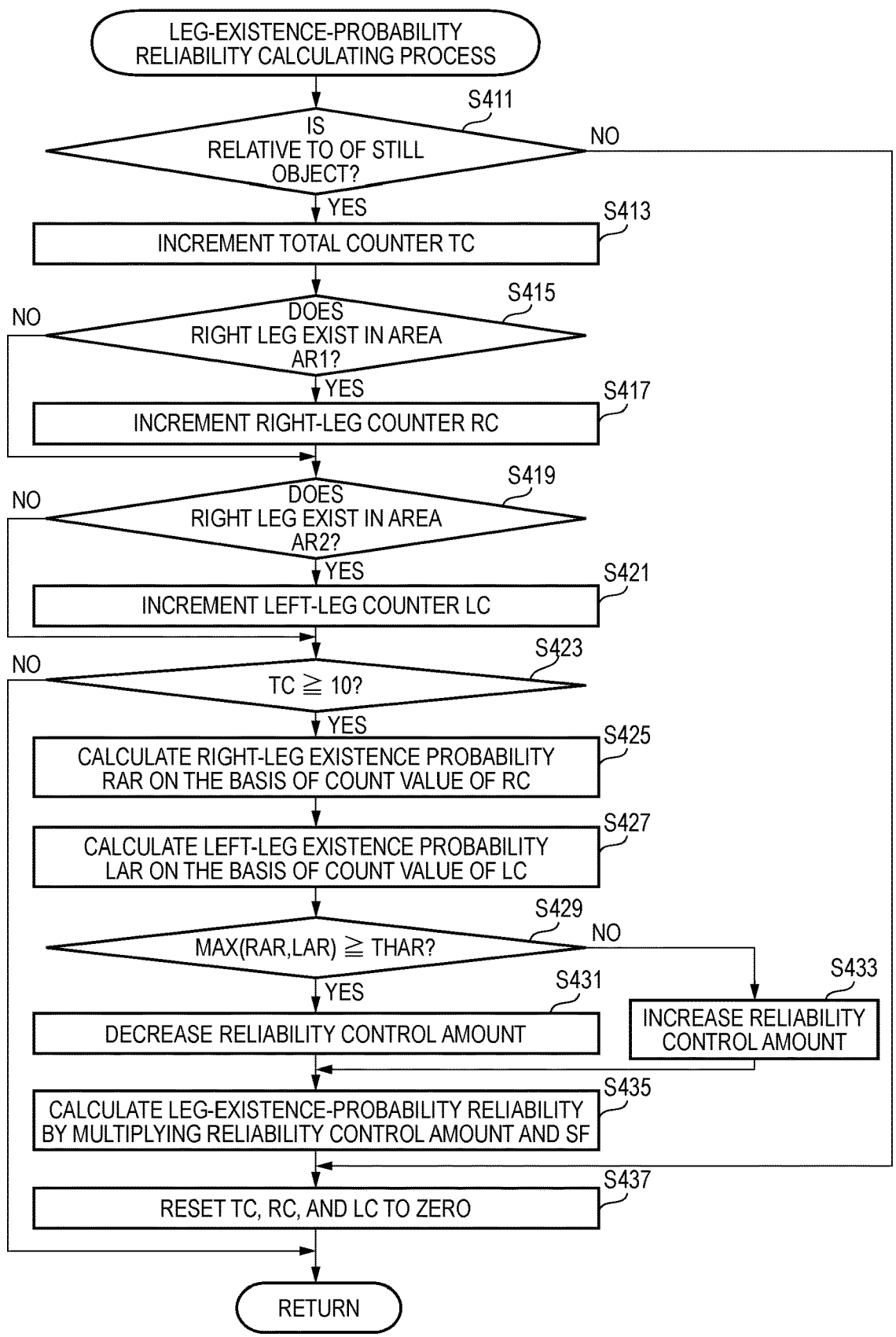
FIG. 21 is a flow chart for explaining an example of a leg-existence-probability reliability calculating process according to the third embodiment of the present invention.

FIG. 21 is a flow chart available for explaining an example of a leg-existence-probability reliability calculating process of the third embodiment.

In STEP S411, the signal processing unit 201 determines whether the target is related to a moving object (that is, whether the target is related to a moving object or related to a still object). In a case where the magnitude of the absolute value of the ground velocity GS calculated from the target is larger than a threshold, the signal processing unit 201 determines that the target is related to a moving object. Meanwhile, in a case where the magnitude is equal to or smaller than the threshold, the signal processing unit determines that the target is related to a still object. In the case where it is determined that the target is related to a still object ("Yes" in STEP S411), the process proceeds to STEP S413. Meanwhile, in a case where it is determined that the target is related to a moving object ("No" in STEP S411), the process proceeds to STEP S437.

Also, the target related to the still object detected by the process of STEP S411 may be a target related to an object having legs of the above-described still object as support poles and existing over the lane where the own vehicle CR runs (for example, a sign, a signboard, or the like having a support pole). Hereinafter, a case where the target related to the still object detected in STEP S411 is set as a reference target, and a target related to the still object is detected in the vicinity of the reference target will be described with respect to a process of determining whether the target related to the still object is a target related to a leg of the still object.

In STEP S413, the signal processing unit 201 increments a total counter TC. The total counter TC is a counter indicating a value relative to the number of times a reference target has been detected.

Subsequently, in STEP S415, the signal processing unit 201 determines whether any right leg (i.e., a right support pole of a sign plate) exists in an area AR1. In a case where it is determined that a right leg exists in the area AR1 ("Yes" in STEP S415), the signal processing unit 201 increments a right-leg counter RC (STEP S417). Meanwhile, in a case where it is determined that any right leg does not exist in the area AR1 ("No" in STEP S415), the right-leg counter RC is not incremented, and the process proceeds to STEP S419.

In STEP S419, the signal processing unit 201 determines whether any left leg (i.e., a left leg of a sign plate) exists in an area AR2. In a case where it is determined that a left leg exists in the area AR2 ("Yes" in STEP S419), the signal processing unit 201 increments a left-leg counter LC (STEP S421). Meanwhile, in a case where it is determined that any left leg does not exist in the area AR2 ("No" in STEP S419), the left-leg counter LC is not incremented, and the process proceeds to STEP S423.

Figure 22:
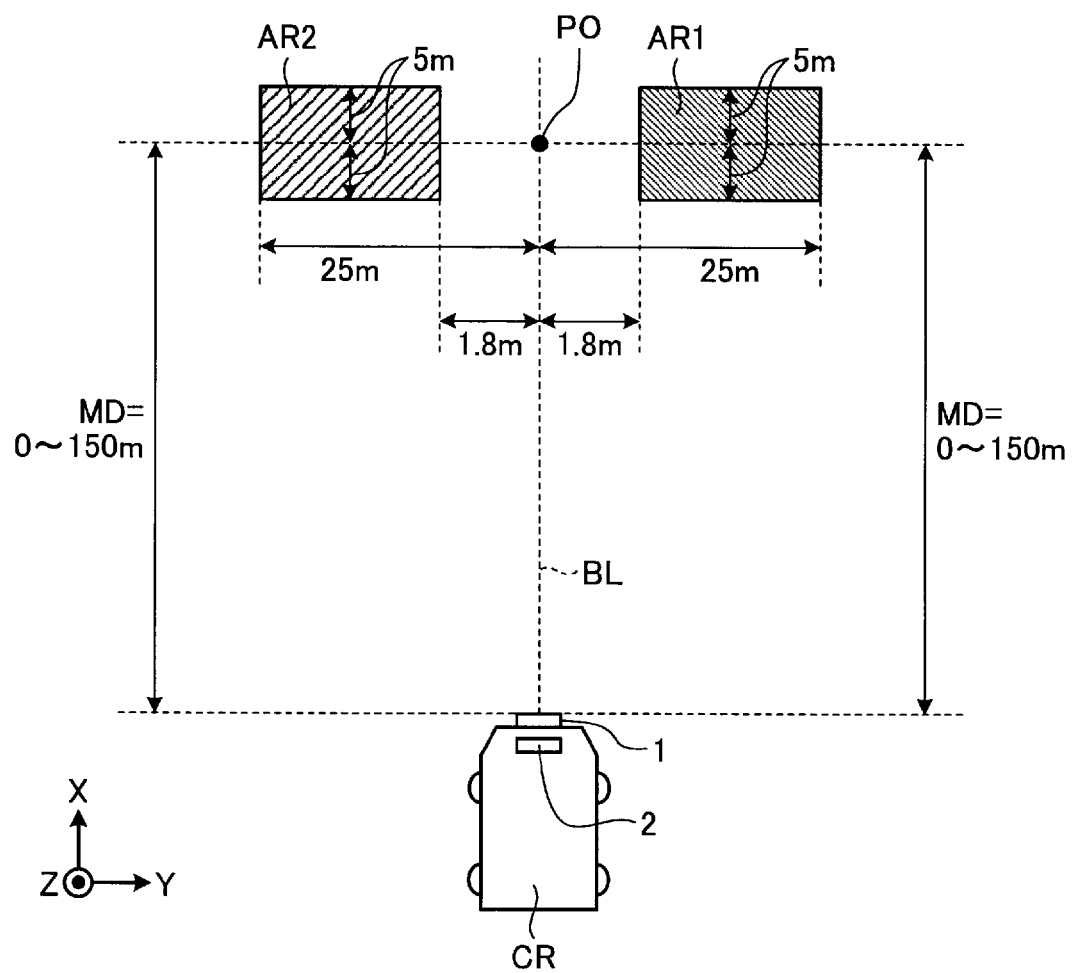
FIG. 22 is a view for explaining an operation example of a signal processing unit according to the third embodiment of the present invention.

Now, the area AR1 and the area AR2 will be described. FIG. 22 is a view available for explaining an operation example of the signal processing unit of the third embodiment. FIG. 22 is a view as seen from above of the vehicle CR in the vertical direction. The areas AR1 and AR2 which are predetermined areas are defined, for example, as follow. Specifically, as shown in FIG. 22, the area AR1 and the area AR2 are rectangular areas. On the assumption that the traveling direction of the vehicle CR is a positive X direction and the width direction of the vehicle CR is positive and negative Y directions, those areas are defined with reference to a position PO which is on the central axis BL of the beam pattern NA and is at a distance MD from the radar device 1 in the positive X direction. For example, the left side of the area AR1 is defined at a distance of 1.8 m from the position PO in the positive Y direction, and the right side of the area AR2 is defined at distance of 1.8 m from the position PO in the negative Y direction. Also, the right side of the area AR1 is defined at a distance of 25 m in the positive Y direction, and the left side of the area AR2 is defined at a distance of 25 m in the negative Y direction. Further, the upper sides of the area AR1 and the area AR2 are defined at a distance of 5 m from the position PO in the positive X direction, and the lower sides of the area AR1 and the area AR2 are defined at a distance of 5 m from the position PO in a negative X direction. In short, the area AR1 and the area AR2 are predetermined areas existing in the traveling direction of the vehicle CR equipped with the radar device 1. The distance MD decreases as the vehicle CR runs, and, for example, the signal processing unit 201 starts to specify the area AR1 and the area AR2 when the distance MD reaches 150 m, and keeps on specifying the areas until the distance MD becomes 0 m.

Referring to FIG. 21 again, in STEP S423, the signal processing unit 201 determines whether the count value of the total counter TC has become 10. In a case where the count value of the total counter TC has become 10 ("Yes" in STEP S423), the process proceeds to STEP S425. Meanwhile, in a case where the count value of the total counter TC has not become 10 ("No" in STEP S423), the leg-existence-probability reliability calculating process finishes.

In STEP S425, the signal processing unit 201 calculates a right-leg existence probability RAR by Expression 6. As shown by Expression 6, the right-leg existence probability RAR is a value corresponding to the count value of the right-leg counter RC.

(Right-Leg Existence Probability RAR)=(Count Value of Right-Leg Counter RC) (6)

Subsequently, in STEP S427, the signal processing unit 201 calculates a left-leg existence probability LAR by Expression 7. As shown by Expression 7, the left-leg existence probability LAR is a value corresponding to the count value of the left-leg counter LC.

(Left-Leg Existence Probability LAR)=(Count Value of Left-Leg Counter LC) (7)

Subsequently, in STEP S429, the signal processing unit 201 sets the maximum value "MAX (RAR, LAR)" f the right-leg existence probability RAR and the left-leg existence probability LAR, as a leg existence probability, and determines whether the leg existence probability is equal to or larger than a threshold THAR. In a case where the leg existence probability is equal to or larger than the threshold THAR ("Yes" in STEP S429), in STEP S431, a reliability control amount is decreased. For example, in a case where the leg existence probability is equal to or larger than 3, the reliability control amount detected by the previous leg-existence-probability reliability processing is decreased by 1. Meanwhile, in a case where the leg existence probability is smaller than the threshold THAR ("No" in STEP S429), in STEP S433, the reliability control amount is increased. For example, in a case where the leg existence probability is smaller than 3, the reliability control amount detected by the previous leg-existence-probability reliability processing is increased by 1.

The reliability control amount is a value which is used to calculate leg-existence-probability reliability to be described below, and as the value of the reliability control amount increases, the reference target is more likely to be a target related to a stopped vehicle, and as the value of the reliability control amount decreases, the reference target is more likely to be a target related to an upper object. Also, in a first leg-existence-probability reliability process, the value of the reliability control amount is "0". In the subsequent processes, the value of the reliability control amount increases. At this time, the maximum value thereof is, for example, "3".

In STEP S435, the signal processing unit 201 calculates leg-existence-probability reliability by Expression 8.

(Leg-Existence-Probability Reliability)=(Reliability Control Amount)×(Magnification SF) (8)

Figure 23:
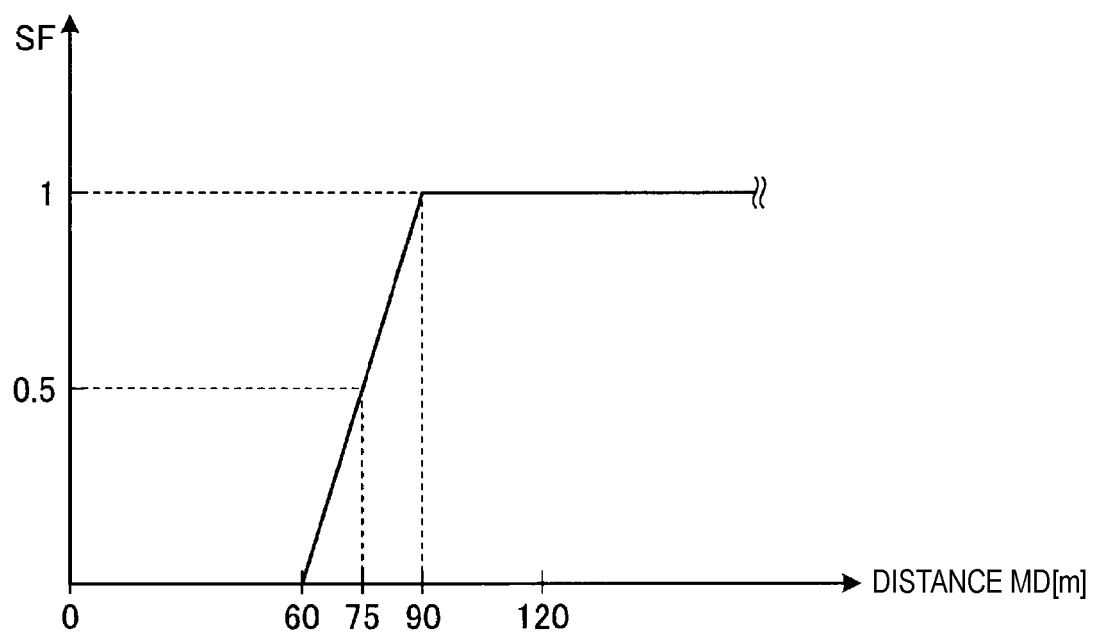
FIG. 23 is a view for explaining the operation example of the signal processing unit according to the third embodiment of the present invention.

Now, the "magnification SF" which is used to calculate leg-existence-probability reliability will be described. FIG. 23 is a view available for explaining an operation example of the signal processing unit of the third embodiment.

Sine there is a limit to the horizontal beam width of the beam pattern NA of a transmission signal which is transmitted by the radar device 1, as the vehicle CR equipped with the radar device 1 gets closer to a leg, the leg is gradually deviated from the irradiation range of the beam pattern NA.

Therefore, as shown in FIG. 23, the magnification SF is defined on the basis of the distance MD from the radar device 1 to the position PO. In other words, as the distance MD decreases, the magnification SF is set to a smaller value. For example, when the distance MD is equal to or longer than 90 m, the signal processing unit 201 sets the magnification SF to "1", and when the distance MD is longer than 60 m and is shorter than 90 m, the signal processing unit sets the magnification SF to a value larger than "0" and smaller than "1", and when the distance MD is equal to or shorter than 60 m, the signal processing unit sets the magnification SF to "0". For example, when the distance MD is 75 m, the signal processing unit sets the magnification SF to "0.5".

Therefore, for example, when the distance MD is 75 m, the magnification SF becomes "0.5", and when the reliability control amount is 2, the leg-existence-probability reliability of the reference target becomes "1".

As described above, the signal processing unit 201 calculates the leg-existence-probability reliability of a reference target whenever scanning is performed, and assigns weights to the past reliability and the current reliability, and adds the weighted past reliability and the weighted current reliability.

In FIG. 22, in the X direction, the distances from the radar device 1 to the centers of the areas AR1 and AR2 are the same as the distance MD from the radar device 1 to the position PO. Therefore, it can be said that the magnification SF is defined on the basis of the distances from the radar device 1 to the areas AR1 and AR2.

As described above, in a case where the leg existence probability is 30% or more, the signal processing unit 201 determines that a reference target is likely to be a target related to an upper object having a support pole, such as a sign or a signboard, and sets the value of reliability to a relatively small value. Also, in a case where the leg existence probability is smaller than 30%, the signal processing unit 201 determines that a reference target is likely to be a target relative to a stopped vehicle, and sets the value of reliability to a relatively large value. In this way, the signal processing unit 201 can accurately determine the types of reference targets.

Referring to FIG. 21 again, in STEP S437, the signal processing unit 201 resets the total counter TC, the right-leg counter RC, and the left-leg counter LC to 0 (zero).

As described above, in the third embodiment, the target information output unit 204 outputs target information items on reference targets having reliability equal to or larger than a threshold, to the vehicle control device 2, but does not output target information items on reference targets having reliability smaller than the threshold. The signal processing unit 201 calculates a probability that a leg exists in the area AR1 or AR2 defined in the traveling direction of the vehicle CR equipped with the radar device 1, and calculates the reliability of a reference target on the basis of the calculated probability.

In this way, it is possible to accurately calculate the reliability of upper objects. Therefore, it is possible to prevent malfunction of the vehicle control device 2.

As a result, in the third embodiment, the signal processing unit 201 multiplies the probability that there is a leg in the area AR1 or AR2 by the magnification SF according to the distances between the radar device 1 and the area AR1 or AR2, thereby calculating reliability.

As a result, it is possible to compensate reliability errors attributable to the limit of the horizontal beam width of the beam pattern NA of transmission signals.

Other Embodiments

[1] In the above description, the case of implementing the third embodiment in combination with the first embodiment has been described. However, the third embodiment can be separately implemented without being combined with the first embodiment.

[2] The individual processes which are performed by the processor 17 may be implemented by executing a program corresponding to the individual processes in the processor 17. For example, the programs corresponding to the above-described individual processes may be stored in the memory 18, such that the processor 17 can read out the individual programs from the memory 18 and execute them. Also, the individual programs do not necessarily need to be stored in the memory 18 in advance. For example, the individual programs may be recorded in a portable recording medium connectable to the radar device 1, such as a magnetic disk, an optical disk, an IC card, or a memory card, in advance, such that the processor 17 can read out the individual programs from the recording medium and execute them. Also, for example, the individual programs may be stored in a computer, a server, or the like connectable to the radar device 1 through the Internet, a LAN, a wireless LAN, or the like, wirelessly or by a cable, such that the individual programs can be read into the processor 17 and be executed in the processor.

[3] In the above-described embodiments, as an example, the case where the radar device 1 has one transmitting antenna and three receiving antennae has been described. However, the number of transmitting antennae may be two or more, and the number of receiving antennae may be four or more.

What is claimed is:

1. A radar device configured to derive information on a target existing in a surrounding area of a vehicle which is equipped with the radar device on the basis of reception signals each of which is obtained by receiving a reflected wave which is obtained by reflection of a transmission wave transmitted to the surrounding area, from the target, the radar device comprising:
a determining unit configured to determine whether the target is an upper object, on the basis of an integrated value of a reception level of each of the reception signals from the target obtained a plurality of times while the vehicle is within a predetermined distance from the object, and an integrated value of ground velocity of the target obtained the plurality of times while the vehicle is within the predetermined distance from the object.

2. The radar device according to claim 1, wherein after the determining unit determines that the target is the upper object, when the reception level of the reception signal tends to increase, the determining unit determines that the target is a moving object.

3. The radar device according to claim 1, wherein the determining unit
calculates a probability that a support pole exists in a predetermined area defined in a traveling direction of the vehicle based on a number of detections of an object in the predetermined area, and
determines a likelihood value indicating a likelihood of the target being the upper object on the basis of a comparison between the probability and a first predetermined threshold.

4. The radar device according to claim 3, wherein
the determining unit determines whether the target is the upper object on the basis of a comparison between a reliability and a second predetermined threshold, and
the reliability is based on a value calculated by multiplying the likelihood value by a magnification value, the magnification value being predetermined in accordance with a distance between the radar device and the predetermined area.

5. A target determining method of a radar device configured to derive information on a target existing in a surrounding area of a vehicle which is equipped with the radar device, the target determining method comprising:
determining, using a processor, on the basis of reception signals each of which is obtained by receiving a reflected wave which is obtained by reflection of a transmission wave transmitted by the radar device to the surrounding area, from the target, whether the target is an upper object, on the basis of an integrated value of a reception level of each of the reception signals from the target obtained a plurality of times while the vehicle is within a predetermined distance from the object, and an integrated value of ground velocity of the target obtained the plurality of times while the vehicle is within the predetermined distance from the object.

6. The radar device according to claim 1, wherein the determining unit calculates the integrated value of the reception level and the integrated value of the ground velocity of the target in response to detecting that the vehicle is within the predetermined distance from the object.

7. The radar device according to claim 1, wherein the integrated value of ground velocity of the target is based on a velocity of the target with respect to a ground.

8. The method according to claim 5, wherein the integrated value of the reception level and the integrated value of the ground velocity of the target are calculated in response to detecting that the vehicle is within the predetermined distance from the object.

9. The method according to claim 5, wherein the integrated value of ground velocity of the target is based on a velocity of the target with respect to a ground.

* * * * *